(12) United States Patent
Takeda et al.

(10) Patent No.: US 12,250,674 B2
(45) Date of Patent: Mar. 11, 2025

(54) MULTI-CARRIER SCHEDULING FOR DOWNLINK AND UPLINK

(71) Applicant: QUALCOMM Incorporated, San Diego, CA (US)

(72) Inventors: Kazuki Takeda, Tokyo (JP); Xiaoxia Zhang, San Diego, CA (US); Tao Luo, San Diego, CA (US); Alberto Rico Alvarino, San Diego, CA (US); Peter Gaal, San Diego, CA (US); Juan Montojo, San Diego, CA (US); Wanshi Chen, San Diego, CA (US); Mostafa Khoshnevisan, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 114 days.

(21) Appl. No.: 17/444,452

(22) Filed: Aug. 4, 2021

(65) Prior Publication Data

US 2022/0046673 A1 Feb. 10, 2022

Related U.S. Application Data

(60) Provisional application No. 63/061,861, filed on Aug. 6, 2020.

(51) Int. Cl.
*H04W 72/04* (2023.01)
*H04W 16/14* (2009.01)
(Continued)

(52) U.S. Cl.
CPC ....... *H04W 72/1268* (2013.01); *H04W 72/23* (2023.01)

(58) Field of Classification Search
None
See application file for complete search history.

(56) References Cited

U.S. PATENT DOCUMENTS

2013/0010709 A1* 1/2013 Earnshaw ............... H04L 5/001
370/329
2013/0058240 A1* 3/2013 Kim ...................... H04L 5/0005
370/252
(Continued)

OTHER PUBLICATIONS

Ericsson: "PDCCH Enhancements for NR URLLC", 3GPP Draft, 3GPP TSG-RAN WG1 Meeting #99, R1-1911945, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), XP051823126, 32 Pages, Retrieved from the Internet: URL: https://ftp.3gpp.org/tsg_ran/WG1_RL1/TSGR1_99/Docs/R1-1911945.zip. R1-1911945 PDCCH Enhancements for NR URLLC.docx [retrieved on Nov. 9, 2019] paragraph [0002].
(Continued)

*Primary Examiner* — Sai Aung
(74) *Attorney, Agent, or Firm* — Harrity & Harrity, LLP

(57) ABSTRACT

Various aspects of the present disclosure generally relate to wireless communication. In some aspects, a user equipment may receive a configuration for monitoring one or more physical downlink control channels (PDCCHs) for downlink control information (DCI) that schedules physical downlink shared channel (PDSCH) communications on each carrier included in a set of carriers and for DCI that schedules physical uplink shared channel (PUSCH) communications on one or more carriers. The UE may monitor the one or more PDCCHs for DCI in accordance with the configuration. The UE may receive DCI that schedules a PUSCH communication on the one or more carriers based at least in part on the monitoring. Numerous other aspects are provided.

30 Claims, 12 Drawing Sheets

(51) Int. Cl.
  *H04W 72/12* (2023.01)
  *H04W 72/1268* (2023.01)
  *H04W 72/23* (2023.01)

(56) References Cited

U.S. PATENT DOCUMENTS

| | | | | |
|---|---|---|---|---|
| 2016/0100382 | A1* | 4/2016 | He | H04L 5/0044 370/329 |
| 2018/0014291 | A1* | 1/2018 | Takeda | H04W 72/044 |
| 2018/0123769 | A1* | 5/2018 | Pelletier | H04L 5/001 |
| 2019/0150124 | A1* | 5/2019 | Nogami | H04L 5/0044 370/330 |
| 2019/0158205 | A1* | 5/2019 | Sheng | H04L 5/0048 |
| 2019/0254110 | A1* | 8/2019 | He | H04L 41/0896 |
| 2019/0268926 | A1* | 8/2019 | Yoshimura | H04W 72/12 |
| 2020/0374967 | A1* | 11/2020 | Nogami | H04W 72/0446 |
| 2021/0385831 | A1* | 12/2021 | Nogami | H04W 72/23 |

OTHER PUBLICATIONS

Huawei, "Summary of Friday Offline Discussion on PDCCH Enhancements", 3GPP Draft, 3GPP TSG RAN WG1 Meeting #98bis, R1-1911717, 3rd Generation Partnership Project (3GPP), Mobile Competence Centre, 650, Route Des Lucioles, F-06921 Sophia-Antipolis Cedex, France, vol. RAN WG1, No. Chongqing. China, Oct. 14, 2019-Oct. 20, 2019, Oct. 22, 2019 (Oct. 22, 2019), XP051798959, 57 Pages, Retrieved from the Internet: URL: https://ftp.3gpp.org/tsg_ran/WG1_RL1/TSGR1_98b/Docs/R1-1911717.zip. R1-1911717.docx. [Retrieved on Oct. 22, 2019], Paragraph [0001]-paragraph [0003].
Huawei: et al., "Enhancements on Multi-TRP/Panel Transmission", 3GPP Draft, 3GPPTSG RAN WG1 Meeting #96bis, R1-1903970, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Apr. 7, 2019 (Apr. 7, 2019), XP051699383, 20 Pages, Retrieved from the Internet: URL: http://www.3gpp.org/ftp/Meetings%5F3GPP%5FSYNC/RAN1/Docs/R1%2D1903970%2Ezip. [retrieved on Apr. 7, 2019] section "Rate Matching Mechanism Enhancement".
International Search Report and Written Opinion—PCT/US2021/071113—ISA/EPO—Dec. 7, 2021.
NOKIA., et al., "Enhancements on Multi-TRP/Panel Transmission", 3GPP Draft, 3GPP TSG RAN WG1 #96 Meeting, R1-1902563, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 25, 2019-Mar. 1, 2019, Feb. 16, 2019 (Feb. 16, 2019), 19 Pages, XP051600257, Retrieved from the Internet: URL: http://www.3gpp.org/ftp/tsg%5Fran/WG1%5FRL1/TSGR1%5F96/Docs/R1%2D1902563%2Ezip [retrieved on Feb. 16, 2019] Sections 3.2 and 4.1.
Qualcomm Incorporated: "PDCCH Enhancements for eURLLC" 3GPP Draft, 3GPP TSG-RAN WG1 Meeting #98b, R1-1911118, PDCCH Enhancements for eURLLC, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 8, 2019 (Oct. 8, 2019), XP051809288, 14 Pages, Retrieved from the Internet: URL: https://ftp.3gpp.org/tsg_ran/WG1_RL1/TSGR1_98b/Docs/R1-1911118.zip. R1-1911118 PDCCH Enhancements for eURLLC. docx [Retrieved on Oct. 8, 2019] Paragraph [0001]-Paragraph [0003].
Qualcomm Incorporated: "Multi-TRP Enhancements", 3GPP Draft, 3GPP TSG RAN WG1 #101-e, R1-2004463, 3rd Generation Partnership Project (3GPP), Mobile Competence Centre, 650, Route Des Lucioles, F-06921, Sophia-Antipolis Cedex, France, vol. RAN WG1, No. May 25, 2020-Jun. 5, 2020, May 16, 2020 (May 16, 2020), XP051886192, 11 pages, Retrieved from the Internet: URL: https://ftp.3gpp.org/tsg_ran/WG1_RL1/TSGR1_101-e/Docs/R1-2004463.zip R1-2004463 Multi-TRP Enhancements.docx [retrieved on May 16, 2020] paragraph [0003], figure 2.
Huawei, "Summary of Friday Offline Discussion on PDCCH Enhancements", 3GPP Draft, 3GPP TSG RAN WG1 Meeting #98bis, R1-1911717, 3rd Generation Partnership Project (3GPP), Mobile Competence Centre, 650, Route Des Lucioles, F-06921 Sophia-Antipolis Cedex, France, vol. RAN WG1, No. Chongqing. China, Oct. 14, 2019-Oct. 20, 2019, Oct. 22, 2019, XP051798959, 57 Pages.
Qualcomm Incorporated: "Multi-TRP Enhancements", 3GPP Draft, 3GPP TSG RAN WG1 #101-e, R1-2004463, 3rd Generation Partnership Project (3GPP), Mobile Competence Centre, 650, Route Des Lucioles, F-06921, Sophia-Antipolis Cedex, France, vol. Ran WG1, No. May 25, 2020-Jun. 5, 2020, May 16, 2020, XP051886192, 11 pages.
Qualcomm Incorporated: "PDCCH Enhancements for eURLLC" 3GPP Draft, 3GPP TSG-RAN WG1 Meeting #98b, R1-1911118, Pdcch Enhancements for eURLLC, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 8, 2019, XP051809288, 14 Pages.

* cited by examiner

MULTI-CARRIER SCHEDULING FOR DOWNLINK AND UPLINK

CROSS-REFERENCE TO RELATED APPLICATION

This patent application claims priority to U.S. Provisional Patent Application No. 63/061,861, filed on Aug. 6, 2020, entitled "MULTI-COMPONENT CARRIER SCHEDULING FOR DOWNLINK AND UPLINK," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for multi carrier scheduling for downlink and uplink communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: receiving a configuration for monitoring one or more physical downlink control channels (PDCCHs) for downlink control information (DCI) that schedules physical downlink shared channel (PDSCH) communications on each carrier included in a set of carriers and for DCI that schedules physical uplink shared channel (PUSCH) communications on one or more carriers; monitoring the one or more PDCCHs for DCI in accordance with the configuration; and receiving DCI that schedules a PUSCH communication on the one or more carriers based at least in part on the monitoring.

In some aspects, a method of wireless communication performed by a base station includes: determining a configuration for a UE for monitoring one or more PDCCHs for DCI that schedules PDSCH communications on each carrier included in a set of carriers and for DCI that schedules PUSCH communications on one or more carriers; transmitting, to the UE, the configuration; and transmitting, to the UE, one or more DCIs that schedules a PUSCH communication on the one or more carriers in accordance with the configuration.

In some aspects, a UE for wireless communication includes: a memory; and one or more processors coupled to the memory. For example, the one or more processors may be operatively, electronically, communicatively, or otherwise coupled to the memory. The memory may include instructions executable by the one or more processors to cause the UE to: receive a configuration for monitoring one or more PDCCHs for DCI that schedules PDSCH communications on each carrier included in a set of carriers and for DCI that schedules PUSCH communications on one or more carriers; monitor the one or more PDCCHs for DCI in accordance with the configuration; and receive DCI that schedules a PUSCH communication on the one or more carriers based at least in part on the monitoring.

In some aspects, a base station for wireless communication includes: a memory; and one or more processors coupled to the memory. For example, the one or more processors may be operatively, electronically, communicatively, or otherwise coupled to the memory. The memory may comprise instructions executable by the one or more processors to cause the base station to: determine a configuration for a UE for monitoring one or more PDCCHs for DCI that schedules PDSCH communications on each carrier included in a set of carriers and for DCI that schedules PUSCH communications on one or more carriers; transmit, to the UE, the configuration; and transmit, to the UE, one or more DCIs that schedules a PUSCH communication on the one or more carriers in accordance with the configuration.

In some aspects, a non-transitory computer-readable medium stores one or more instructions for wireless communication, the one or more instructions, when executed by one or more processors of a UE, cause the UE to: receive a configuration for monitoring one or more PDCCHs for DCI that schedules PDSCH communications on each carrier included in a set of carriers and for DCI that schedules PUSCH communications on one or more carriers; monitor the one or more PDCCHs for DCI in accordance with the configuration; and receive DCI that schedules a PUSCH communication on the one or more carriers based at least in part on the monitoring.

In some aspects, a non-transitory computer-readable medium stores one or more instructions for wireless communication, the one or more instructions, when executed by one or more processors of a base station, cause the base station to: determine a configuration for a UE for monitoring one or more PDCCHs for DCI that schedules PDSCH communications on each carrier included in a set of carriers and for DCI that schedules PUSCH communications on one or more carriers; transmit, to the UE, the configuration; and transmit, to the UE, one or more DCIs that schedules a PUSCH communication on the one or more carriers in accordance with the configuration.

In some aspects, an apparatus for wireless communication includes: means for receiving a configuration for monitoring one or more PDCCHs for DCI that schedules PDSCH communications on each carrier included in a set of carriers and for DCI that schedules PUSCH communications on one or more carriers; means for monitoring the one or more PDCCHs for DCI in accordance with the configuration; and means for receiving DCI that schedules a PUSCH communication on the one or more carriers based at least in part on the monitoring.

In some aspects, an apparatus for wireless communication includes: means for determining a configuration for a UE for monitoring one or more PDCCHs for DCI that schedules PDSCH communications on each carrier included in a set of carriers and for DCI that schedules PUSCH communications on one or more carriers; means for transmitting, to the UE, the configuration; and means for transmitting, to the UE, one or more DCIs that schedules a PUSCH communication on the one or more carriers in accordance with the configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
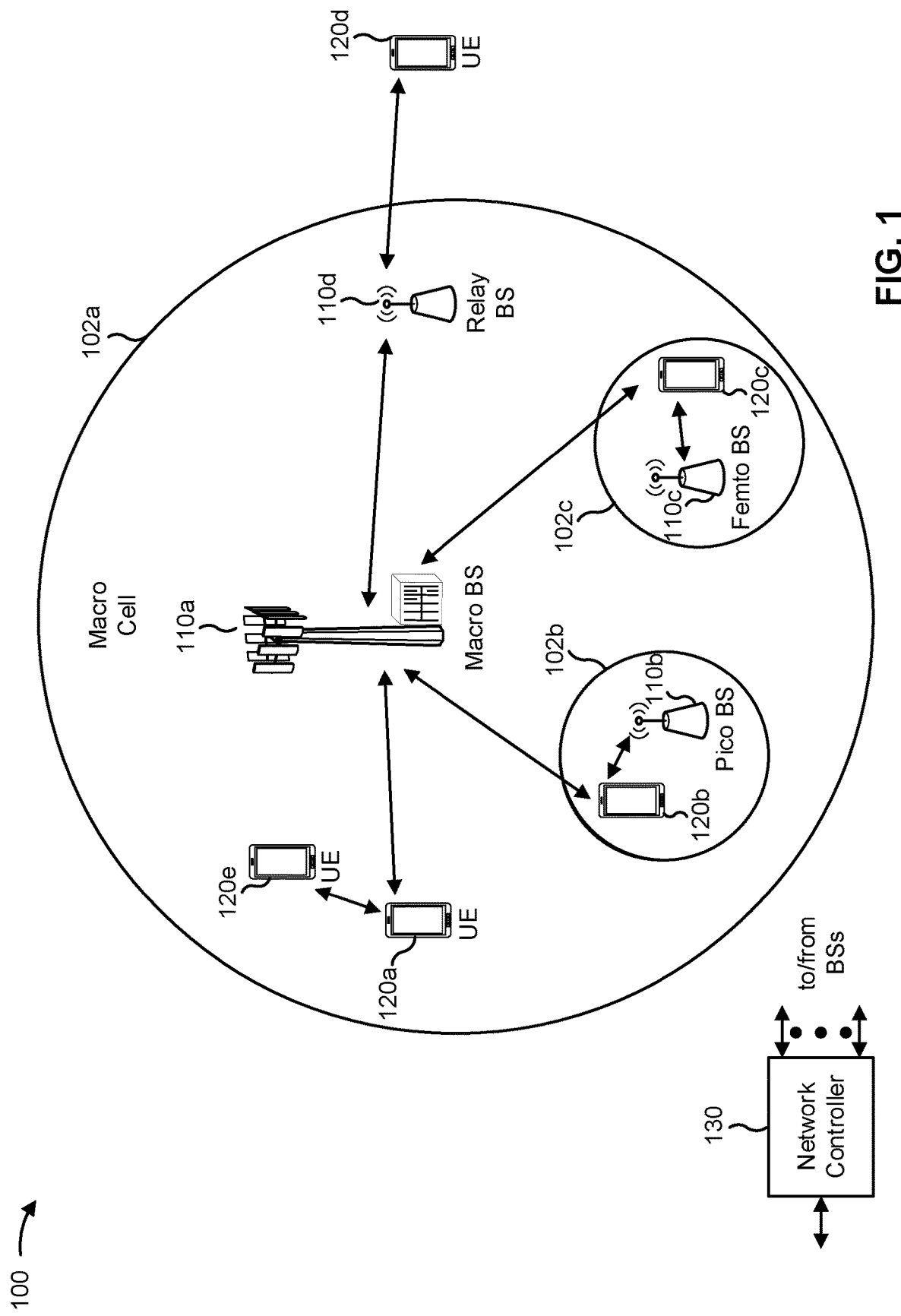
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
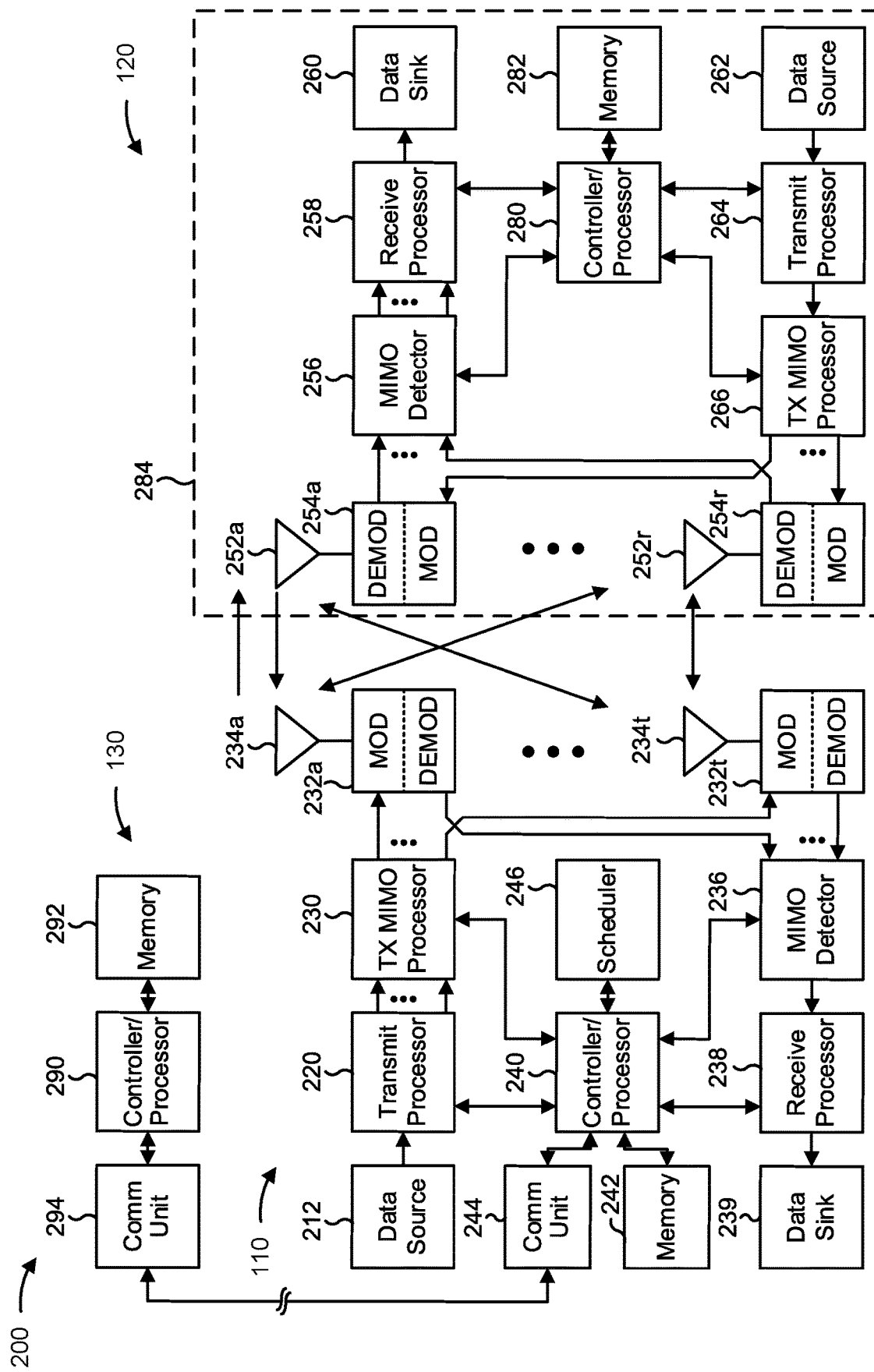
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-10).

Controller/processor 240 of base station 110, controller/processor 280 of UE 120, and/or any other component(s) of FIG. 2 may perform one or more techniques associated with multi-carrier scheduling for downlink and uplink communications, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, UE 120 may include means for receiving a configuration for monitoring one or more physical downlink control channels (PDCCHs) for downlink control information (DCI) that schedules physical downlink shared channel (PDSCH) communications on each carrier included in a set of carriers and for DCI that schedules physical uplink shared channel (PUSCH) communications on one or more carriers, means for monitoring the one or more PDCCHs for DCI in accordance with the configuration, means for receiving DCI that schedules a PUSCH communication on the one or more carriers based at least in part on the monitoring, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining a configuration for a UE for monitoring one or more PDCCHs for DCI that schedules PDSCH communications on each carrier included in a set of carriers and for DCI that schedules PUSCH communications on one or more carriers, means for transmitting, to the UE, the configuration, means for transmitting, to the UE, one or more DCIs that schedules a PUSCH communication on the one or more carriers in accordance with the configuration, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
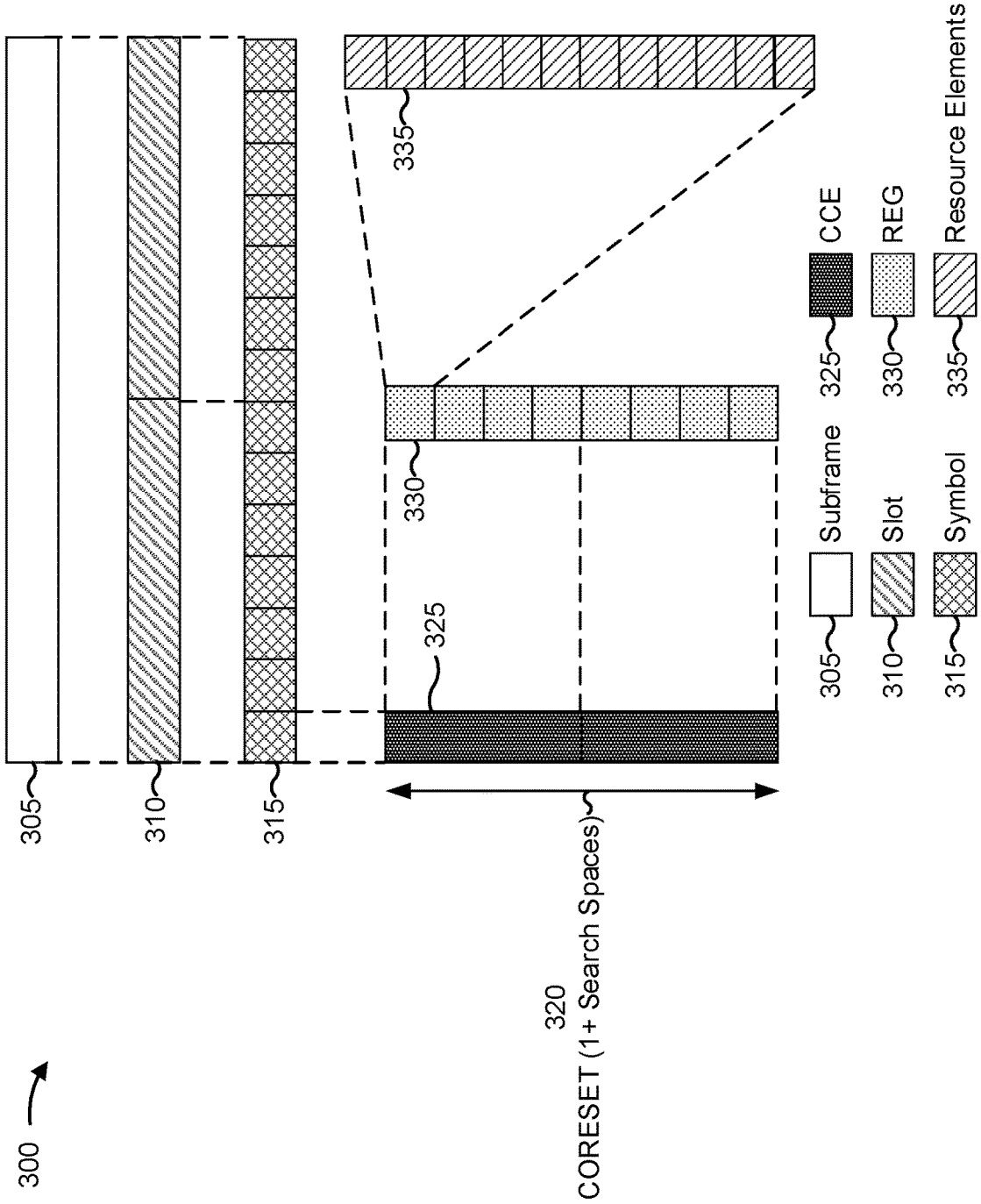
FIG. 3 is a diagram illustrating an example resource structure for wireless communication, in accordance with the present disclosure.

FIG. 3 is a diagram illustrating an example resource structure 300 for wireless communication, in accordance with the present disclosure. Resource structure 300 shows an example of various groups of resources described herein. As shown, resource structure 300 may include a subframe 305. Subframe 305 may include multiple slots 310. While resource structure 300 is shown as including 2 slots per subframe, a different number of slots may be included in a subframe (e.g., 4 slots, 8 slots, 16 slots, 32 slots, and/or the like). In some aspects, different types of transmission time intervals (TTIs) may be used, other than subframes and/or slots. A slot 310 may include multiple symbols 315, such as 7 symbols or 14 symbols per slot.

The potential control region of a slot 310 may be referred to as a control resource set (CORESET) 320 and may be structured to support an efficient use of resources, such as by flexible configuration or reconfiguration of resources of the CORESET 320 for one or more PDCCHs, one or more PDSCHs, and/or the like. In some aspects, the CORESET 320 may occupy the first symbol 315 of a slot 310, the first two symbols 315 of a slot 310, or the first three symbols 315 of a slot 310. Thus, a CORESET 320 may include multiple resource blocks (RBs) in the frequency domain, and either one, two, or three symbols 315 in the time domain. In 5G, a quantity of resources included in the CORESET 320 may be flexibly configured, such as by using radio resource control (RRC) signaling to indicate a frequency domain region (e.g., a quantity of resource blocks) and/or a time domain region (e.g., a quantity of symbols) for the CORESET 320.

As illustrated, a symbol 315 that includes CORESET 320 may include one or more control channel elements (CCEs) 325, shown as two CCEs 325 as an example, that span a portion of the system bandwidth. A CCE 325 may include downlink control information (DCI) that is used to provide control information for wireless communication. A base station may transmit DCI during multiple CCEs 325 (as shown), where the quantity of CCEs 325 used for transmission of DCI represents the aggregation level (AL) used by the BS for the transmission of DCI. In FIG. 3, an aggregation level of two is shown as an example, corresponding to two CCEs 325 in a slot 310. In some aspects, different aggregation levels may be used, such as 1, 4, 8, 16, and/or the like.

Each CCE 325 may include a fixed quantity of resource element groups (REGs) 330, shown as 4 REGs 330, or may include a variable quantity of REGs 330. In some aspects, the quantity of REGs 330 included in a CCE 325 may be specified by a REG bundle size. A REG 330 may include one resource block, which may include 12 resource elements (REs) 335 within a symbol 315. A resource element 335 may occupy one subcarrier in the frequency domain and one OFDM symbol in the time domain.

A search space may include all possible locations (e.g., in time and/or frequency) where a PDCCH may be located. A CORESET 320 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs), an aggregation level being used, and/or the like. A possible location (e.g., in time and/or frequency) for a PDCCH may be referred to as a PDCCH candidate, and the set of all possible PDCCH locations may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space.

A CORESET 320 may be interleaved or non-interleaved. An interleaved CORESET 320 may have CCE-to-REG mapping such that adjacent CCEs are mapped to scattered REG bundles in the frequency domain (e.g., adjacent CCEs are not mapped to consecutive REG bundles of the CORESET 320). A non-interleaved CORESET 320 may have a CCE-to-REG mapping such that all CCEs are mapped to consecutive REG bundles (e.g., in the frequency domain) of the CORESET 320.

As indicated above, FIG. 3 is provided as an example. Other examples may differ from what is described with respect to FIG. 3.

Figure 4:
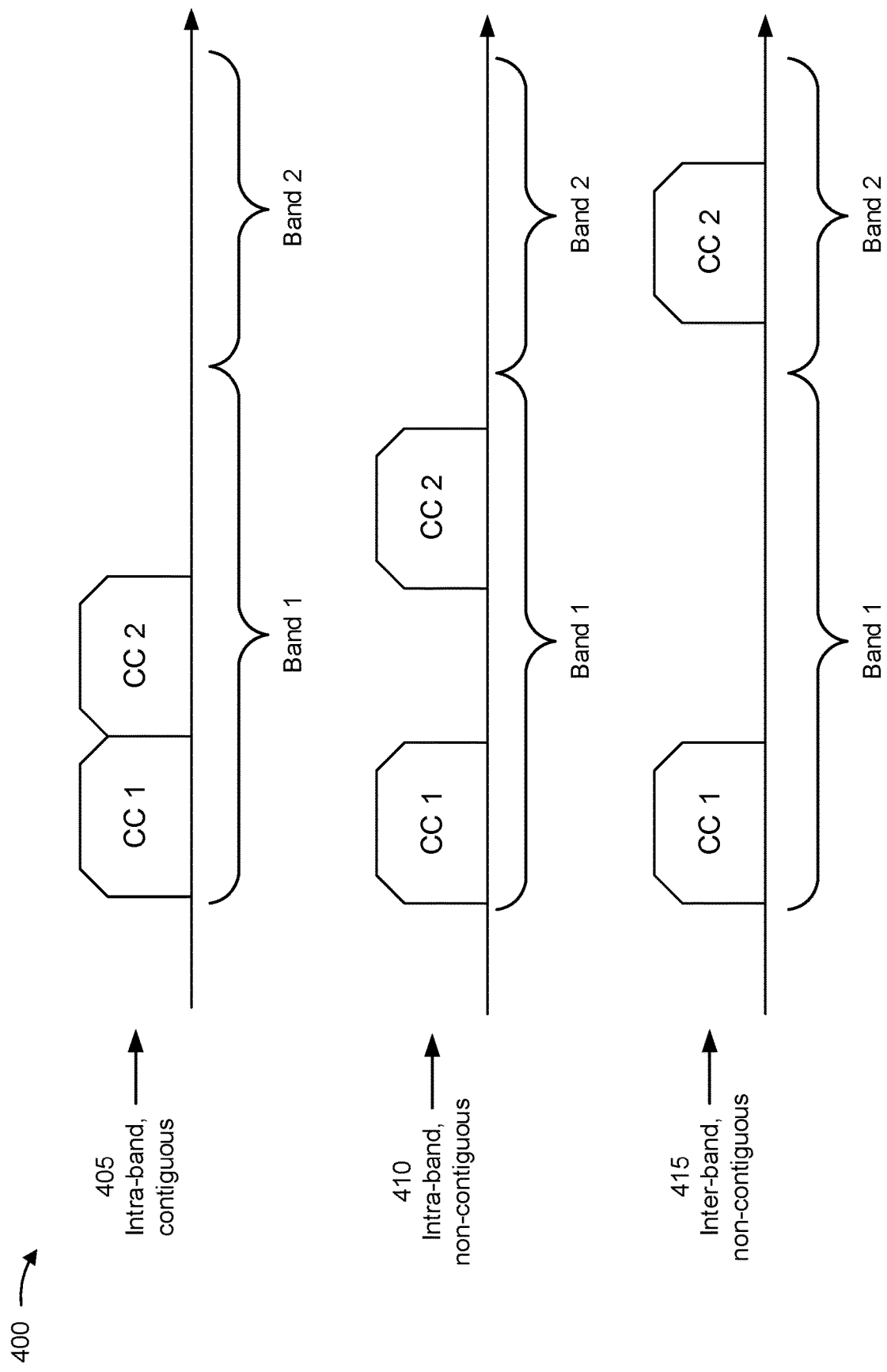
FIG. 4 is a diagram illustrating examples of carrier aggregation, in accordance with the present disclosure.

FIG. 4 is a diagram illustrating examples 400 of carrier aggregation, in accordance with the present disclosure.

Carrier aggregation is a technology that enables two or more component carriers (CCs) (which may be referred to as carriers) to be combined (e.g., into a single channel) for a single UE 120 to enhance data capacity. A "carrier" may include, and/or may be referred to as, a "component carrier." For example, "carrier" and "component carrier" may be used interchangeably herein. As shown, carriers can be combined in the same or different frequency bands. Additionally, or alternatively, contiguous or non-contiguous carriers can be combined. A base station 110 may configure carrier aggregation for a UE 120, such as in a radio resource control (RRC) message, a DCI message, and/or the like.

As shown by reference number 405, in some aspects, carrier aggregation may be configured in an intra-band contiguous mode where the aggregated carriers are contiguous to one another and are in the same band. As shown by reference number 410, in some aspects, carrier aggregation may be configured in an intra-band non-contiguous mode where the aggregated carriers are non-contiguous to one another and are in the same band. In some aspects, aggregated carriers in the same band (e.g., contiguous and non-contiguous) may use the same subcarrier spacing (SCS). As shown by reference number 415, in some aspects, carrier aggregation may be configured in an inter-band non-contiguous mode where the aggregated carriers are non-contiguous to one another and are in different bands. In some aspects, aggregated carriers in different bands may use different SCS.

In carrier aggregation, a UE 120 may be configured with a primary carrier and one or more secondary carriers. In some aspects, the primary carrier may carry control information (e.g., downlink control information, scheduling information, and/or the like) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

As indicated above, FIG. 4 is provided as an example. Other examples may differ from what is described with regard to FIG. 4.

Carrier aggregation provides a mechanism for cross-carrier scheduling, in which a single carrier may schedule communications on multiple carriers) (e.g., multi-carrier scheduling). In some aspects, a PDCCH of a serving cell may carry DCI that schedules communications (e.g., a physical downlink shared channel (PDSCH) communication or a physical uplink shared channel (PUSCH) communication) on another serving cell in addition to or without scheduling a PDSCH or PUSCH on the serving cell. For example, a PDCCH of a secondary cell (SCell) may schedule a communication on a primary cell (PCell) or a primary secondary cell (PSCell). As another example, a PDCCH of a serving cell (e.g., a PCell, a PSCell, or an SCell) may schedule a PDSCH on multiple cells (e.g., on multiple carriers) using a single DCI. Additionally, when a UE is configured to support carrier aggregation, a PDCCH may schedule communications on each aggregated carrier using a single DCI. In some aspects, a UE may be configured for multi-carrier scheduling for downlink communications (e.g., PDSCH communications). However, the scheduling of multiple carriers using a single DCI for downlink communications while also scheduling uplink communications (e.g., PUSCH communications) may increase a size of the DCI and increase blind decoding complexity for the PDCCH, which negates some of the benefits of multi-carrier scheduling and which uses significant computing and communication resources of a UE.

Some techniques and apparatuses described herein enable multi-carrier scheduling for downlink and uplink communications. For example, a UE may be configured with multi-carrier scheduling for PDSCH communications. The configuration may indicate that the UE is to use multi-carrier scheduling for PUSCH communications, is to use self-scheduling for PUSCH communications, is to use cross-scheduling for PUSCH communications, and/or the like. For example, where a set of carriers (e.g., a set of carriers) for downlink communications is the same as a set of carriers (e.g., a set of carriers) for uplink communications, the UE may be configured with multi-carrier scheduling for both PDSCH communications and PUSCH communications (e.g., using the same set of PDCCH candidates or different sets of PDCCH candidates). In some aspects, the UE may be configured with multi-carrier scheduling for PDSCH communications and single-carrier and self-carrier scheduling for PUSCH communications (e.g., each cell may schedule PDSCH communications for that cell). In some aspects, the UE may be configured with multi-carrier scheduling for PDSCH communications and single-carrier and cross-carrier scheduling for PUSCH communications (e.g., a single cell may schedule PDSCH communications on a single carrier basis for that cell and one or more other cells).

As a result, the UE is enabled to utilize multi-carrier scheduling for PDSCH communications while also enabling the UE to schedule PUSCH communications (e.g., using multi-carrier scheduling or single-carrier scheduling) without increasing the DCI size or blind decoding complexity for the PDCCH as the UE is configured to use a multi-carrier scheduling DCI for PUSCH communications or a single-carrier scheduling DCI for a PUSCH communication.

Figure 5:
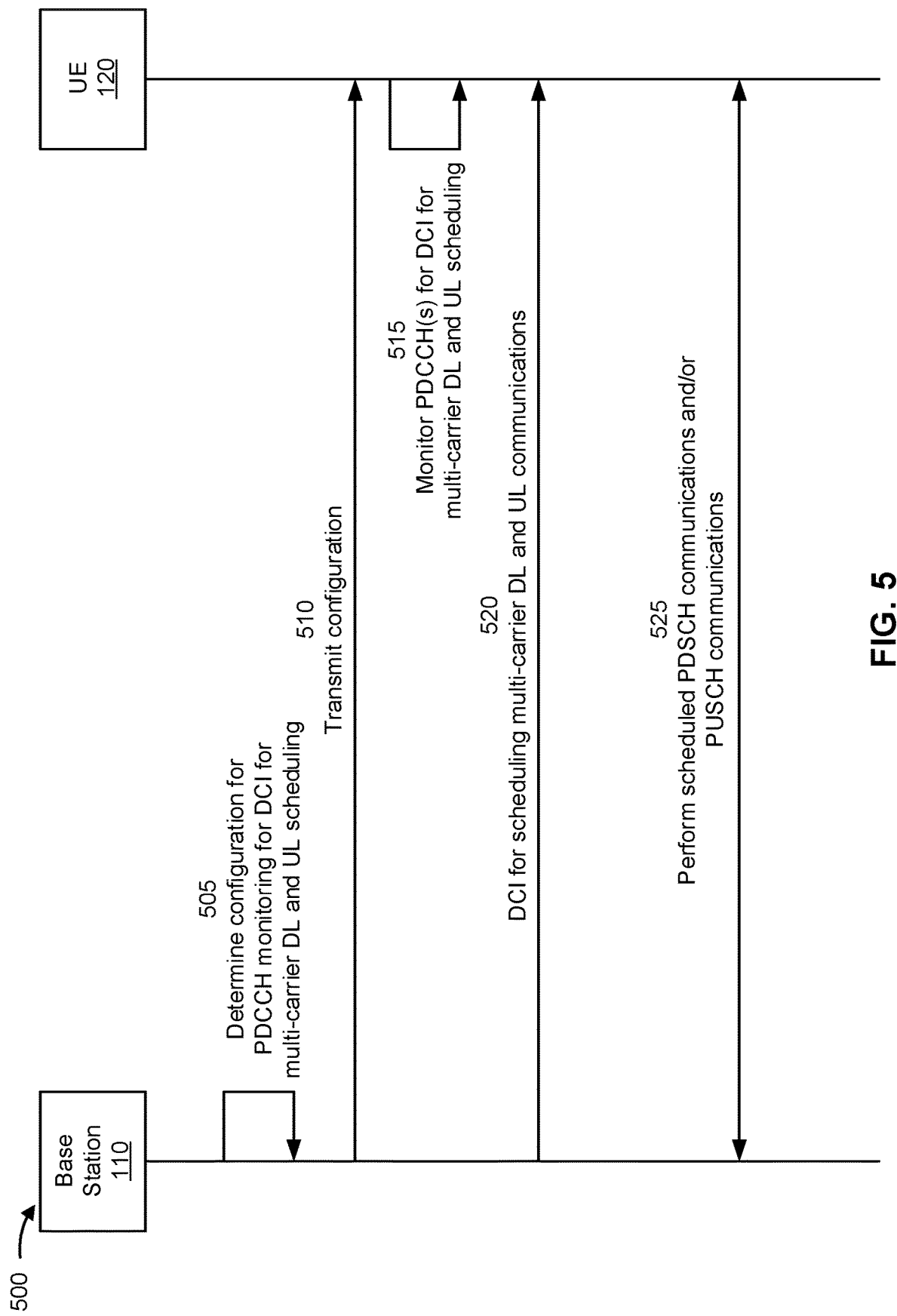
FIGS. 5-8 are diagrams illustrating examples associated with multi-carrier scheduling for downlink and uplink communications, in accordance with the present disclosure.

FIG. 5 is a diagram illustrating an example 500 associated with multi-carrier scheduling for downlink and uplink communications, in accordance with the present disclosure. As shown in FIG. 5, example 500 includes communication between a base station 110 and a UE 120. In some aspects, the base station 110 and the UE 120 may be included in a wireless network, such as wireless network 100. The base station 110 and the UE 120 may communicate on a wireless access link, which may include an uplink and a downlink.

In some aspects, the UE 120 may communicate with one or more base stations 110. For example, the UE 120 may be operating in a dual connectivity mode (e.g., an Evolved Universal Mobile Telecommunications System Terrestrial Radio Access (E-UTRA)-NR dual connectivity (ENDC) mode, an NR-E-UTRA dual connectivity (NEDC) mode, an NR dual connectivity (NRDC) mode, or another dual connectivity mode). For example, the UE 120 may communicate with a first base station 110 associated with a first serving cell (e.g., a master cell group, a secondary cell group, a PCell, a PSCell, an Scell, and/or the like). The UE 120 may communicate with a second base station 110 associated with a second serving cell (e.g., a master cell group, a secondary cell group, a PCell, a PSCell, an Scell, and/or the like).

As show by reference number 505, the base station 110 may determine a configuration for the UE 120 for monitoring one or more PDCCHs for DCI that schedules PDSCH communications on a carrier included in a set of carriers and for DCI that schedules PUSCH communications on one or more carriers (e.g., that are included in the set of carriers or that are different carriers).

In some aspects, the set of carriers may be associated with a set of serving cells that are serving the UE 120. For example, the UE 120 may be served by three serving cells (e.g., a first serving cell, a second serving cell, and a third serving cell). Each serving cell may be associated with a carrier (e.g., the first serving cell may be associated with CC1, the second serving cell may be associated with CC2, and the third serving cell may be associated with CC3). A set of carriers may include CC1 and CC2, another set of carriers may include CC1 and CC3, another set of carriers may include CC2 and CC3, another set of carriers may include CC1, CC2, and CC3, and/or the like. Therefore, as referred to herein, "multi-carrier scheduling" may refer to multi-cell scheduling (e.g., where a single DCI schedules communications on multiple serving cells of a UE 120).

The base station 110 may determine a set of PDCCH candidates for the DCI that schedules PDSCH communications on each carrier included in the set of carriers (e.g., DCI that is capable of multi-carrier scheduling for PDSCH) and one or more other sets of PDCCH candidates for DCI that schedules PDSCH communications on one or more other sets of carriers. In some aspects, the set of PDCCH candidates for DCI that schedule PDSCH communications on multiple carriers and the set of PDCCH candidates for DCI that schedule PUSCH communications are the same set of PDCCH candidates. In some aspects, the set of PDCCH candidates for DCI that schedule PDSCH communications on multiple carriers and the set of PDCCH candidates for DCI that schedule PUSCH communications are different sets of PDCCH candidates.

The base station 110 may determine a configuration for DCI that utilizes multi-carrier scheduling for PDSCH. In some aspects, the base station 110 may determine that a set of carriers is associated with a set of PDCCH candidates for DCI that schedules PDSCH communications on the set of carriers. The base station 110 may determine a configuration for a set of PDCCH candidates that includes a search space configuration, a carrier indicator field (CIF), a payload size associated with DCI that is transmitted using the set of PDCCH candidates, a DCI format that is transmitted using the set of PDCCH candidates, and/or the like.

In some aspects, the base station 110 may determine configurations for multiple sets of PDCCH candidates. For example, the base station 110 may transmit DCI using a first set of PDCCH candidates (in accordance with a first configuration) to schedule PDSCH communications on a first set of carriers. The base station 110 may transmit DCI using a second set of PDCCH candidates (in accordance with a second configuration) to schedule PDSCH communications on a second set of carriers. In this way, the UE 120 may be enabled to differentiate between DCI that schedules PDSCH communications on the first set of carriers and DCI that schedules PDSCH communications on the second set of carriers.

The base station 110 may determine a set of PDCCH candidates for DCI that schedules PUSCH communications on one or more carriers. In some aspects, if the UE 120 supports uplink carrier aggregation such that uplink carriers of the UE 120 are the same carriers as downlink carriers of the UE 120 (e.g., a set of carriers are used for both uplink communications and downlink communications), then a set of PDCCH candidates for DCI that schedules PUSCH communications at the UE 120 may be the same as the set of PDCCH candidates for DCI that schedules PDSCH communications on multiple carriers (e.g., on the set of carriers). That is, the configuration may indicate that the PUSCH communications on the set of carriers are to be scheduled by DCI that is capable of multi-carrier uplink scheduling (e.g., where a single DCI communication schedules multiple PUSCH communications on each carrier included in the set of carriers). A PDCCH that supports multi-carrier scheduling for both uplink communications and downlink communications is depicted and described in more detail below with respect to FIG. 6.

As described above, when a UE 120 is capable of supporting multi-carrier scheduling for both downlink communications and uplink communications (e.g., where the UE 120 supports uplink carrier aggregation), the base station 110 may determine a single set of PDCCH candidates for transmitting DCI to the UE 120. The base station 110 may determine a search space configuration for the set of PDCCH candidates. In some aspects, the base station 110 may indicate a DCI payload size for downlink DCI and a DCI payload size for uplink DCI (e.g., to enable the UE 120 to differentiate between DCI that is scheduling PDSCH communications on the set of carriers and DCI that is scheduling PUSCH communications on the set of carriers).

In some aspects, the DCI payload size for downlink DCI may be the same as the payload size for uplink DCI. In that case, the base station 110 may determine that a field in the DCI is to be used to differentiate between downlink DCI and uplink DCI. For example, the configuration may indicate that the identifier is to be used by the UE 120 to differentiate between downlink DCI and uplink DCI. If the base station 110 transmits DCI to schedule PDSCH communications on multiple carriers (e.g., the set of carriers) then the DCI will include the identifier associated with downlink DCI. If the base station 110 transmits DCI to schedule PUSCH communications on multiple carriers (e.g., the set of carriers) then the DCI will include the identifier associated with uplink DCI.

In some aspects, when a UE 120 is capable of supporting multi-carrier scheduling for both downlink communications and uplink communications (e.g., where the UE 120 supports uplink carrier aggregation), the base station 110 may determine a first set of PDCCH candidates for downlink DCI and a second set of PDCCH candidates for uplink DCI. The base station 110 may determine a first search space configuration for the first set of PDCCH candidates and a second search space configuration for the second set of PDCCH candidates.

In some aspects, if the base station 110 determines that the UE 120 does not support uplink carrier aggregation or if the base station 110 determines that the uplink carriers for the UE 120 are not the same as the downlink carriers for the UE 120, the base station 110 may determine that the UE 120 is to be configured with single-carrier scheduling DCI for PUSCH communications. For example, the base station 110 may determine that PUSCH scheduling for the UE 120 should be performed using a DCI format for scheduling PUSCH communications on a single carrier (e.g., DCI format 0_0, 0_1, 0_2, and/or the like). The configuration may indicate a set of PDCCH candidates for each uplink carrier of the UE 120. In some aspects, the base station 110 may determine a configuration (e.g., a search space configuration, a CIF value, a DCI payload size, and/or the like) for each set of PDCCH candidates for each uplink carrier of the UE 120.

In some aspects, the base station 110 may determine that downlink data is to be scheduled at the UE 120 using multi-carrier scheduling (e.g., using a single DCI to schedule PDSCH communications on multiple carriers) and that uplink data is to be scheduled at the UE 120 using single-carrier scheduling. In some aspects, the single-carrier scheduling may be self-carrier scheduling. "Self-carrier scheduling" may refer to DCI being sent on a PDCCH associated with the carrier (or the serving cell) on which the PUSCH communication is to be scheduled. The base station 110 may determine a set of PDCCH candidates for DCI that schedules downlink data on multiple carriers, and a set of PDCCH candidates for DCI that schedules uplink data on the carrier associated with the base station 110 (e.g., on the serving cell associated with the base station 110). In some aspects, another base station 110 may determine a set of PDCCH candidates for DCI that schedules uplink data on the carrier associated with other base station 110 (e.g., on another serving cell that is associated with the other base station 110). PDCCHs that support multi-carrier scheduling for downlink data and single-carrier/self-carrier scheduling for uplink data are depicted and described in more detail below with respect to FIG. 7.

In some aspects, the single-carrier scheduling may be cross-carrier scheduling. "Cross-carrier scheduling" may refer to transmitting DCI on a PDCCH that is associated with a scheduling carrier. That is, the UE 120 is configured to monitor the scheduling carrier for DCI that schedules a PUSCH communication in a single-carrier manner (e.g., on the scheduling carrier or on another carrier). In some aspects, the base station 110 may determine a set of PDCCH candidates associated with each uplink carrier (e.g., the base station 110 may determine a set of PDCCH candidates for DCI that schedules uplink data on a first carrier, a set of PDCCH candidates for DCI that schedules uplink data on a second carrier, and so on). In some aspects, the base station 110 may determine a CIF value that is associated with each set of PDCCH candidates associated with DCI that schedules uplink data. PDCCHs that support multi-carrier scheduling for downlink data and single-carrier/cross-carrier scheduling for uplink data are depicted and described in more detail below with respect to FIG. 8.

In some aspects, when the base station 110 determines that downlink data is to be scheduled using multi-carrier scheduling and that uplink data is to be scheduled using single-carrier scheduling, a UE 120 may be configured to monitor for downlink DCI and uplink DCI on a same carrier (e.g., on a same serving cell and/or the like). In some aspects, the set of PDCCH candidates for DCI that schedules downlink data in a multi-carrier manner may be that same as the set of PDCCH candidates for DCI that schedules uplink data in a single-carrier manner. For example, the base station 110 may determine a search space configuration for the set of PDCCH candidates.

In some aspects, the configuration may indicate that the UE 120 is to differentiate between downlink DCI (that schedules downlink data in a multi-carrier manner) and uplink DCI (that schedules uplink data in a single-carrier manner) based at least in part on a payload size of the DCI. In some aspects, if the payload size of downlink DCI is the same as the payload size of uplink DCI, the configuration may indicate that the UE 120 is to differentiate between downlink DCI and uplink DCI based at least in part on an identifier indicated in the DCI. For example, an identifier in DCI may indicate that the DCI is scheduling downlink data. Similarly, an identifier in DCI may indicate that the DCI is scheduling uplink data.

In some aspects, the set of PDCCH candidates for DCI that schedules downlink data in a multi-carrier manner may be different than the set of PDCCH candidates for DCI that schedules uplink data in a single-carrier manner. For example, the base station 110 may determine a first search space configuration for a first set of PDCCH candidates for DCI that schedules downlink data in a multi-carrier manner and a second search space configuration for a second set of PDCCH candidates for DCI that schedules uplink data in a single-carrier manner. In some aspects, the base station 110 may determine that each set of PDCCH candidates is associated with different CIF values. For example, if the UE 120 is associated with two carriers (e.g. CC1 and CC2), the base station 110 may determine that a set of PDCCH candidates for scheduling uplink data on CC1 (e.g., in a single-carrier manner) is associated with a first CIF value, a set of PDCCH candidates for scheduling uplink data on CC2 (e.g., in a single-carrier manner) is associated with a second CIF value, and a set of PDCCH candidates for scheduling downlink data on CC1 and CC2 (e.g., in a multi-carrier manner) is associated with a third CIF value.

As shown by reference number 510, the base station 110 may transmit the configuration for PDCCH monitoring to the UE 120. The base station 110 may transmit the configuration using upper-layer (or higher-layer) signaling. For example, the base station 110 may transmit the configuration using RRC signaling. In some aspects, other types of signaling for transmitting the configuration may be used, such as medium access control (MAC) signaling, DCI signaling, and/or the like. The UE 120 may receive the configuration from the base station 110 and identify the configuration and one or more sets of PDCCH candidates to monitor. In some aspects, the UE 120 may receive a first configuration from a first base station 110 (e.g., identifying a configuration for monitoring a PDCCH associated with the first base station 110) and may receive a second configuration from a second base station 110 (e.g., identifying a configuration for monitoring a PDCCH associated with the second base station 110).

As shown by reference number 515, the UE 120 may monitor one or more PDCCHs for DCI in accordance with the configuration. For example, the UE 120 may monitor a PDCCH (e.g., monitor a set of PDCCH candidates) for DCI that schedules PDSCH communications on multiple carriers associated with the UE 120. In some aspects, when the configuration indicates that multi-carrier scheduling is to be used for uplink data, the UE 120 may monitor the PDCCH (e.g., monitor the set of PDCCH candidates) for DCI that schedules PUSCH communications on the multiple carriers associated with the UE 120.

In some aspects, the UE 120 may monitor a first set of PDCCH candidates for DCI that schedules PDSCH communications on multiple carriers associated with the UE 120 and a second set of PDCCH candidates for DCI that schedules PUSCH communications on the multiple carriers associated with the UE 120. For example, the UE 120 may monitor a first set of PDCCH candidates in a first search space configured by a first search space configuration for DCI that schedules PDSCH communications on each carrier included in a set of carriers associated with the UE 120. The UE 120 may monitor a second set of PDCCH candidates in a second search space configured by a second search space configuration for DCI that schedules PUSCH communications on each carrier included in the set of carriers.

In some aspects, when the configuration indicates that single-carrier scheduling is to be used for uplink data, the UE 120 may monitor for DCI on each uplink carrier associated with the UE 120 or on a scheduling carrier associated with the UE 120. In some aspects, the UE 120 may monitor multiple sets of PDCCH candidates for DCI that schedules uplink data on uplink carriers of the UE 120 (e.g., may monitor a first set of PDCCH candidates for DCI that schedules uplink data on a first uplink carrier, may monitor a second set of PDCCH candidates for DCI that schedules uplink data on a second uplink carrier, and so on).

As shown by reference number 520, the base station 110 may transmit, and the UE 120 may receive, DCI for scheduling downlink data in a multi-carrier manner and/or DCI for scheduling uplink data (e.g., in a multi-carrier manner or in a single-carrier manner). The DCI may schedule downlink communications on multiple carriers of the UE 120. In some aspects, the DCI may schedule uplink communications on multiple carriers of the UE 120. In some aspects, the DCI may schedule uplink communications on a single carrier of the UE 120.

For example, the UE 120 may receive DCI and determine (e.g., based at least in part on the configuration, an identifier included in the DCI, a search space in which the DCI was transmitted, a set of PDCCH candidates that was used to transmit the DCI, a payload size of the DCI, a format type of the DCI, and/or the like) that the DCI is downlink DCI that is scheduling PDSCH communications on multiple carriers of the UE 120. The UE 120 may reserve resources indicated by the DCI for a PDSCH communication on each carrier of the multiple carriers. In some aspects, the UE 120 may receive DCI and determine (e.g., based at least in part on the configuration, an identifier included in the DCI, a search space in which the DCI was transmitted, a set of PDCCH candidates that was used to transmit the DCI, a payload size of the DCI, a format type of the DCI, and/or the like) that the DCI is uplink DCI that is scheduling one or more PUSCH communications. The UE 120 may determine that the DCI is a multi-carrier scheduling DCI and may schedule PUSCH communications on multiple carriers. The UE 120 may determine that the DCI is a single-carrier scheduling DCI and may schedule a PUSCH communication on a single carrier.

As shown by reference number 525, the base station 110 (or multiple base stations 110) and the UE 120 may perform the scheduled PDSCH communications and/or the scheduled PUSCH communications. For example, the UE 120 may receive a first PDSCH communication on a first carrier and a second PDSCH communication on a second carrier (e.g., scheduled using multi-carrier scheduling). The UE 120 may transmit one or more scheduled PUSCH communications (e.g., scheduled using multi-carrier scheduling or single-carrier scheduling).

As a result, the UE 120 is enabled to utilize multi-carrier scheduling for PDSCH communications while also enabling the UE to schedule PUSCH communications (e.g., using multi-carrier scheduling or single-carrier scheduling) without increasing the DCI size or blind decoding complexity for the PDCCH as the UE 120 is configured to use a multi-carrier scheduling DCI for PUSCH communications or a single-carrier scheduling DCI for a PUSCH communication.

As indicated above, FIG. 5 is provided as an example. Other examples may differ from what is described with respect to FIG. 5.

Figure 6:
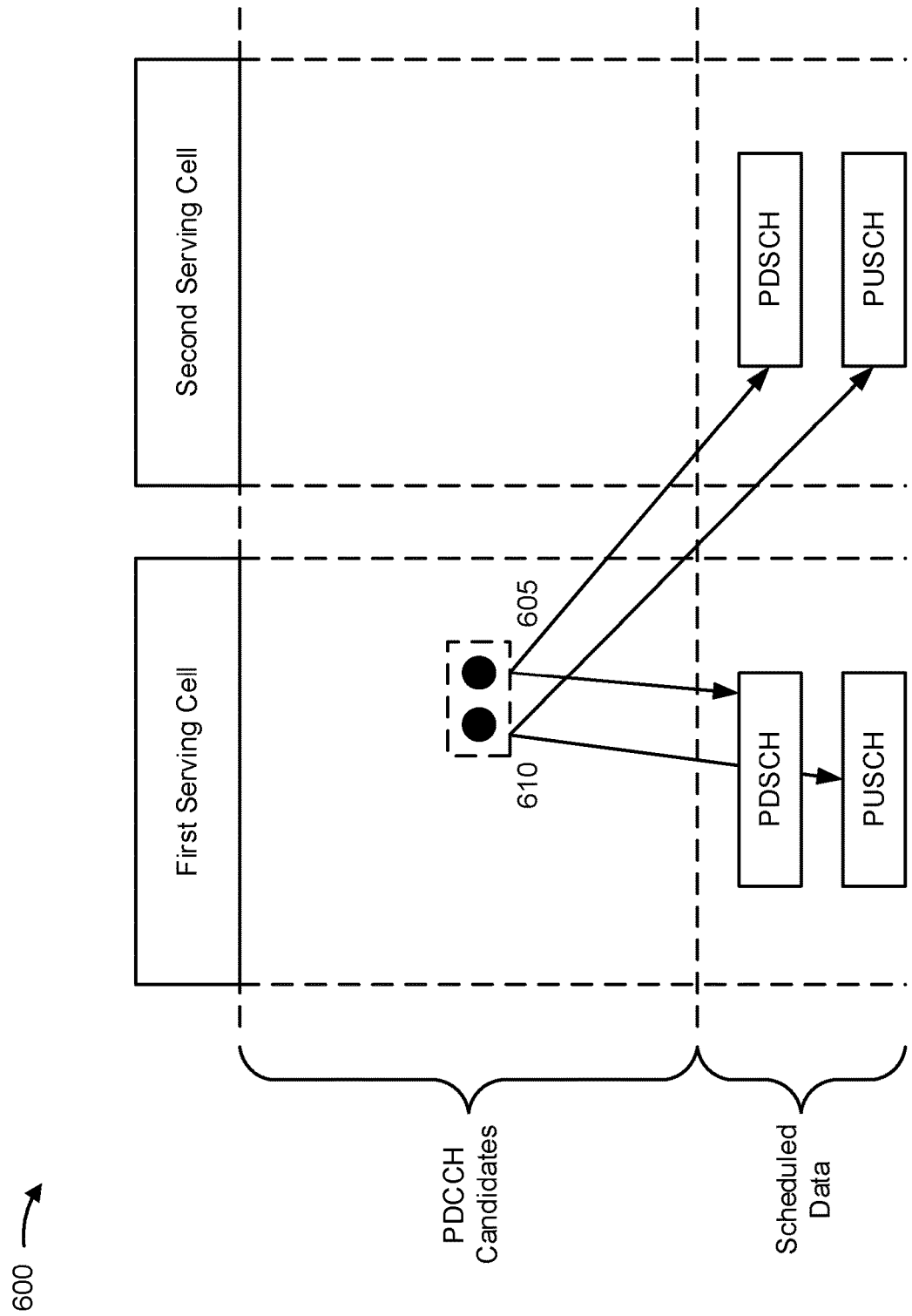

FIG. 6 is a diagram illustrating an example 600 associated with multi-carrier scheduling for downlink and uplink communications, in accordance with the present disclosure. As shown in FIG. 6, a UE 120 may be served by a first serving cell and a second serving cell. In some aspects, the first serving cell may be associated with a first carrier (e.g., a first carrier) and the second serving cell may be associated with a second carrier (e.g., a second carrier). In some aspects, the first carrier and the second carrier may be aggregated for downlink data communications (e.g., for PDSCH communications). In some aspects, the first serving cell may be a primary cell (e.g., a PCell) and the second serving cell may be a secondary cell (e.g., a PSCell, an SCell, and/or the like). In some aspects, the first serving cell may be a secondary cell and the second serving cell may be a primary cell.

Example 600 depicts a UE 120 that may be configured with multi-carrier scheduling for PDSCH communications and multi-carrier scheduling for PUSCH communications. For example, the UE 120 may support carrier aggregation for uplink carriers (e.g., the first carrier and the second carrier may be aggregated for uplink as well as downlink).

The UE 120 may be configured to monitor a set of PDCCH candidates for DCI that schedules PDSCH communications on multiple carriers and for DCI that schedules PUSCH communications on multiple carriers. For example, as shown in FIG. 6, the set of PDCCH candidates may be associated with the first serving cell. As a result, DCI transmitted using the PDCCH candidates associated with the first serving cell may schedule communications (e.g., PDSCH communications or PUSCH communications) on the first serving cell (e.g., on the first carrier) and the second serving cell (e.g., on the second carrier). The UE 120 may be configured with a search space for monitoring the set of PDCCH candidates within the PDCCH of the first serving cell.

As shown by reference number 605, a base station 110 associated with the first serving cell may transmit DCI for scheduling a PDSCH communication on the first serving cell and for scheduling a PDSCH on the second serving cell. The UE 120 may receive the DCI based at least in part on monitoring the PDCCH candidates in the search space. In some aspects, the UE 120 may determine that the DCI is scheduling PDSCH communications based at least in part on a payload size of the DCI, an identifier indicated in the DCI, and/or the like. The UE 120 may reserve or allocate resources (e.g., indicated by the DCI) for the PDSCH communication on the first serving cell and may reserve or allocate resources (e.g., indicated by the DCI) for the PDSCH communication on the second serving cell.

As shown by reference number 610, the base station 110 associated with the first serving cell may transmit DCI for scheduling a PUSCH communication on the first serving cell and for scheduling a PUSCH on the second serving cell. In some aspects, the UE 120 may determine that the DCI is scheduling PUSCH communications based at least in part on a payload size of the DCI, an identifier indicated in the DCI, and/or the like. The UE 120 may reserve or allocate resources (e.g., indicated by the DCI) for the PUSCH communication on the first serving cell and may reserve or allocate resources (e.g., indicated by the DCI) for the PUSCH communication on the second serving cell.

In some aspects, the UE 120 may be configured to monitor a first set of PDCCH candidates in a first search space for DCI that schedules PDSCH communications on the first serving cell and the second serving cell and a second set of PDCCH candidates in a second search space for DCI that schedules PUSCH communications on the first serving cell and the second serving cell. The base station 110 associated with the first serving cell may transmit DCI for scheduling a PDSCH communication on the first serving cell and for scheduling a PDSCH communication on the second serving cell using the first set of PDCCH candidates. The base station 110 associated with the first serving cell may transmit DCI for scheduling a PUSCH communication on the first serving cell and for scheduling a PUSCH communication on the second serving cell using the second set of PDCCH candidates. The UE 120 may determine if DCI is scheduling PDSCH communications or PUSCH communications based at least in part on the set of PDCCH candidates used to transmit the DCI. This may conserve resources and improve network efficiency as a serving cell may use a single DCI to schedule multiple PDSCH communications and may use a single DCI to schedule multiple PDSCH communications while also not increasing blind PDCCH decoding complexity associated with the UE 120 receiving DCI.

Additionally, this may conserve network resources as DCI for multiple serving cells may be transmitted on a single serving cell. For example, the carrier for the second serving cell may operate with dynamic spectrum sharing (DSS) and may have limited resources available due to a sharing of resources between multiple RATs. Therefore, resources associated with transmitting DCI for the UE 120 can be allocated to the first serving cell (which may not operate with DSS and may have more resources available). As a result, the network may improve efficiency by transmitting DCI on the first serving cell for both the first serving cell and the second serving cell.

As indicated above, FIG. 6 is provided as an example. Other examples may differ from what is described with respect to FIG. 6.

Figure 7:
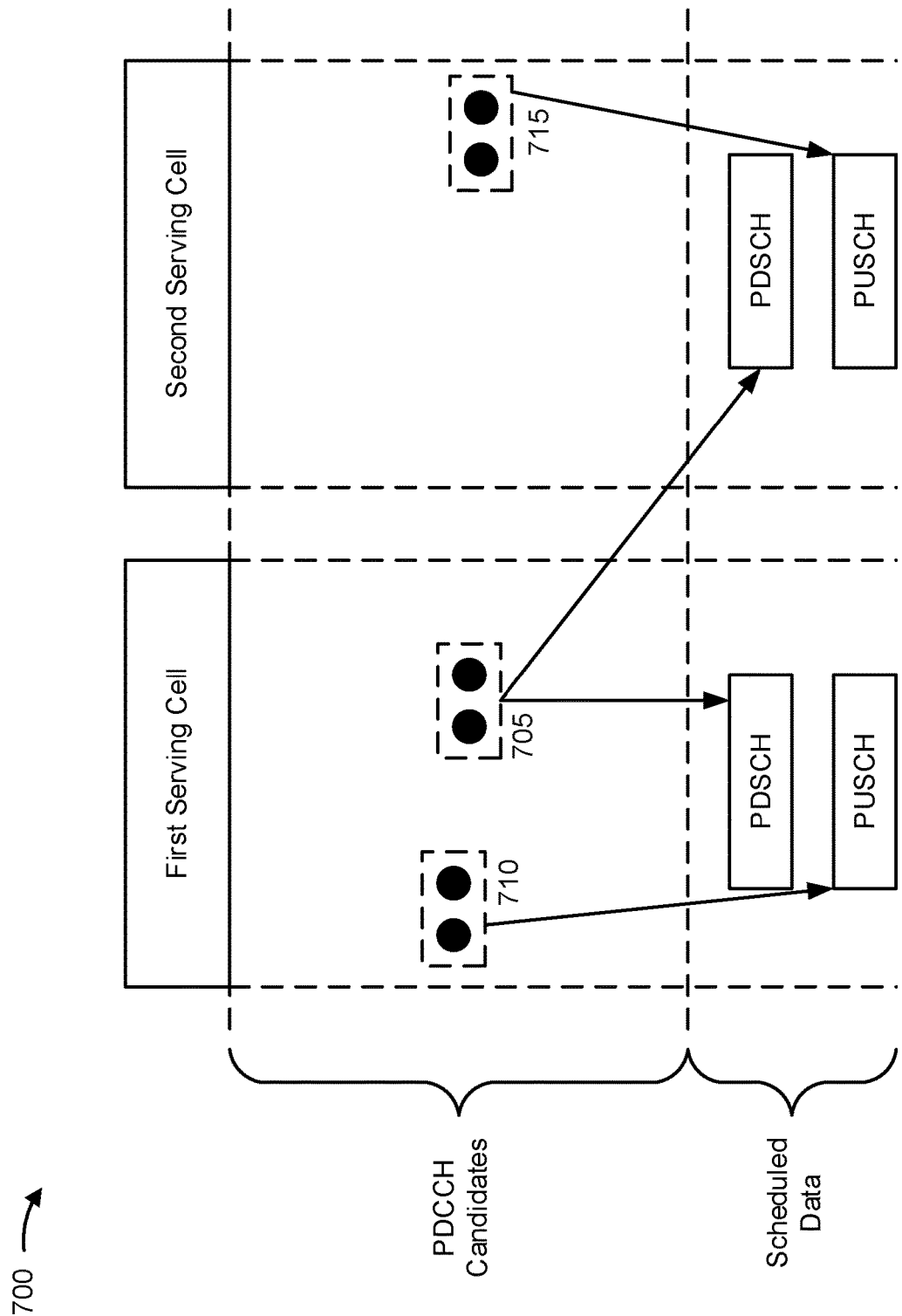

FIG. 7 is a diagram illustrating an example 700 associated with multi-carrier scheduling for downlink and uplink communications, in accordance with the present disclosure. As shown in FIG. 7, a UE 120 may be served by a first serving cell and a second serving cell. In some aspects, the first serving cell may be associated with a first carrier and the second serving cell may be associated with a second carrier. In some aspects, the first carrier and the second carrier may be aggregated for downlink data communications (e.g., for PDSCH communications). In some aspects, the first serving cell may be a primary cell (e.g., a PCell) and the second serving cell may be a secondary cell (e.g., a PSCell, an SCell, and/or the like). In some aspects, the first serving cell may be a secondary cell and the second serving cell may be a primary cell.

Example 700 depicts a UE 120 that may be configured with multi-carrier scheduling for PDSCH communications and single-carrier scheduling for PUSCH communications. As shown in FIG. 7, the single-carrier scheduling may be self-carrier scheduling (e.g., the first serving cell may transmit DCI for scheduling a PUSCH communication on the first serving cell and the second serving cell may transmit DCI for scheduling a PUSCH communication on the second serving cell). In some aspects, the UE 120 may support carrier aggregation for uplink carriers (e.g., the first carrier and the second carrier may be aggregated for uplink as well as downlink). In some aspects, the UE 120 may not support carrier aggregation for uplink carriers.

The UE 120 may be configured to monitor a set of PDCCH candidates for DCI that schedules PDSCH communications on the first serving cell and the second serving cell (e.g., for a multi-carrier scheduling DCI), a set of PDCCH candidates for DCI that schedules PUSCH communications on the first serving cell (e.g., for a single-carrier scheduling DCI), and a set of PDCCH candidates for DCI that schedules PUSCH communications on the second serving cell (e.g., for a single-carrier scheduling DCI). The UE 120 may monitor each set of PDCCH candidates in search spaces associated with each set of PDCCH candidates.

In some aspects, the UE 120 may be configured to monitor for downlink DCI (e.g., multi-carrier scheduling DCI) and uplink DCI (e.g., single-carrier scheduling DCI) on the same serving cell (e.g., the first serving cell as shown in FIG. 7) or the same carrier. In some aspects, the set of PDCCH candidates associated with the first serving cell for downlink DCI may be the same as the set of PDCCH candidates associated with the first serving cell for uplink DCI. In some aspects, the set of PDCCH candidates associated with the first serving cell for downlink DCI may be different than the set of PDCCH candidates associated with the first serving cell for uplink DCI (e.g., as shown in FIG. 7).

As shown by reference number 705, the base station 110 associated with the first serving cell may transmit a single DCI to schedule a PDSCH communication on the first serving cell (e.g., on the first carrier) and to schedule a PDSCH communication on the second serving cell (e.g., on the second carrier). The UE 120 may receive the DCI based at least in part on monitoring the set of PDCCH candidates associated with the DCI in a search space. If the set of PDCCH candidates associated with the first serving cell for downlink DCI is the same as the set of PDCCH candidates associated with the first serving cell for uplink DCI, the UE 120 may determine that the DCI is scheduling PDSCH communications on both the first serving cell and the second serving cell based at least in part on a payload size of the DCI, an identifier indicated by the DCI, and/or the like. In some aspects, if the set of PDCCH candidates associated with the first serving cell for downlink DCI is different than the set of PDCCH candidates associated with the first serving cell for uplink DCI, the UE 120 may determine that the DCI is scheduling PDSCH communications on both the first serving cell and the second serving cell based at least in part on the set of PDCCH candidates used to transmit the DCI.

As shown by reference number 710, the base station 110 associated with the first serving cell may transmit DCI to schedule a PUSCH communication on the first serving cell (e.g., on the first carrier). The UE 120 may receive the DCI based at least in part on monitoring the set of PDCCH candidates associated with the DCI in a search space. If the set of PDCCH candidates associated with the first serving cell for downlink DCI is the same as the set of PDCCH candidates associated with the first serving cell for uplink DCI, the UE 120 may determine that the DCI is scheduling a PUSCH communication on the first serving cell based at least in part on a payload size of the DCI, an identifier indicated by the DCI, and/or the like. In some aspects, if the set of PDCCH candidates associated with the first serving cell for downlink DCI is different than the set of PDCCH candidates associated with the first serving cell for uplink DCI, the UE 120 may determine that the DCI is scheduling a PUSCH communication on the first serving cell based at least in part on the set of PDCCH candidates used to transmit the DCI.

As shown by reference number 715, a base station 110 associated with the second serving cell (which may be the same base station 110 that is associated with the first serving cell or a different base station 110) may transmit DCI to schedule a PUSCH communication on the second serving cell (e.g., on the second carrier). The UE 120 may receive the DCI based at least in part on monitoring the set of PDCCH candidates associated with the DCI in a search space. As the UE 120 may not be configured to monitor for downlink DCI in the second serving cell (e.g., on the second carrier), the UE 120 may determine that the DCI is scheduling a PUSCH communication on the second serving cell based at least in part on the set of PDCCH candidates used to transmit the DCI, the base station 110 that transmits the DCI, and/or the like.

As described above, the UE 120 may monitor for uplink DCI at each carrier (e.g., as the UE 120 is configured to use single-carrier scheduling DCI for PUSCH communications). However, the UE 120 may not monitor for downlink DCI at each carrier (e.g., as the UE 120 is configured to use multi-carrier scheduling DCI for PDSCH communications). This may conserve resources and improve network efficiency as the UE 120 may use a single DCI to schedule multiple PDSCH communications while also not increasing blind PDCCH decoding complexity associated with the UE 120 receiving DCI.

Additionally, this may conserve network resources as DCI for multiple serving cells may be transmitted on a single serving cell. For example, the carrier for the second serving cell may operate with DSS and may have limited resources available due to a sharing of resources between multiple RATs. Therefore, resources associated with transmitting DCI that schedules PDSCH communications for the UE 120 can be allocated to the first serving cell (which may not operate with DSS and may have more resources available). As a result, the network may improve efficiency by transmitting DCI on the first serving cell for both the first serving cell and the second serving cell.

As indicated above, FIG. 7 is provided as an example. Other examples may differ from what is described with respect to FIG. 7.

Figure 8:
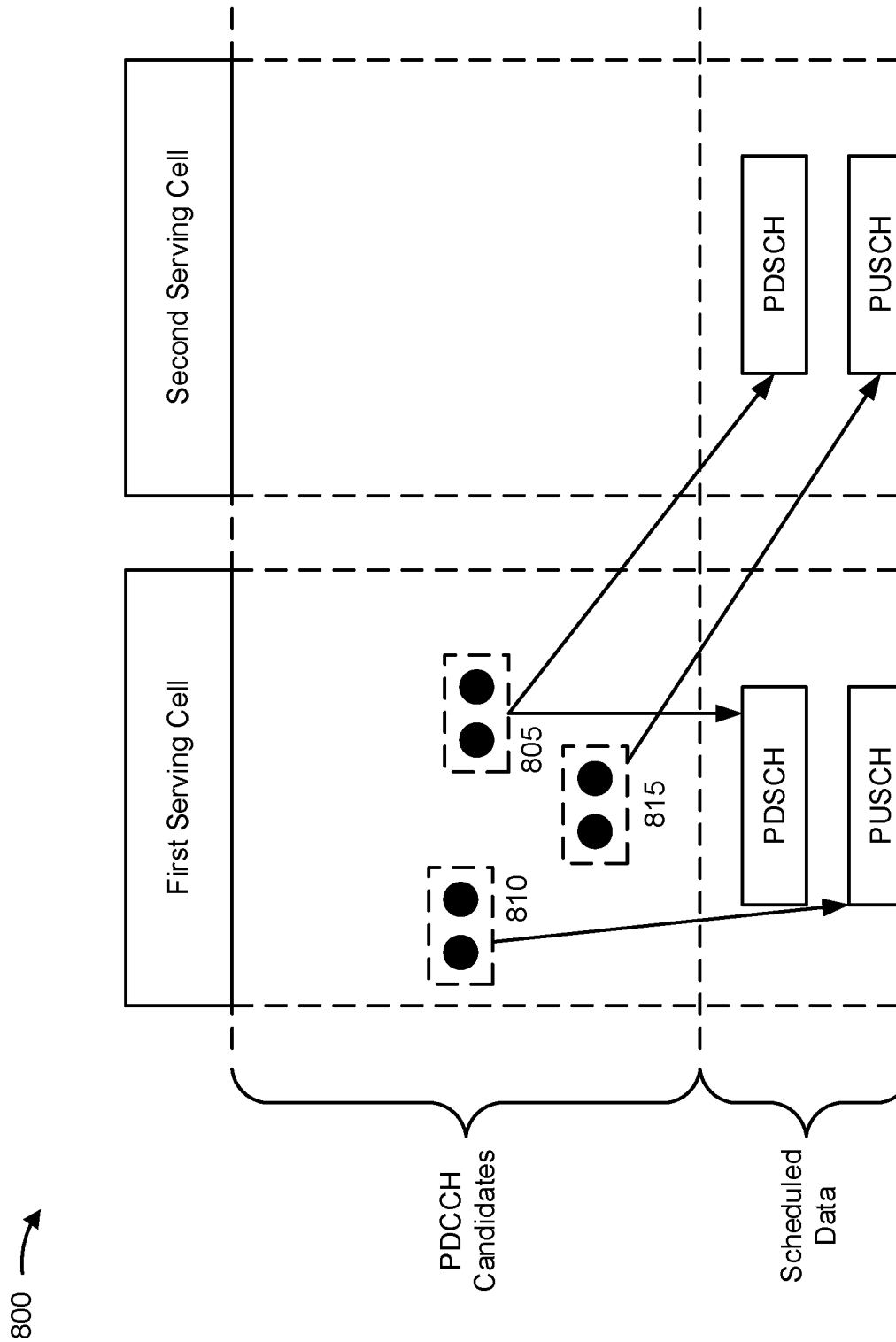

FIG. 8 is a diagram illustrating an example 800 associated with multi-carrier scheduling for downlink and uplink communications, in accordance with the present disclosure. As shown in FIG. 8, a UE 120 may be served by a first serving cell and a second serving cell. In some aspects, the first serving cell may be associated with a first carrier and the second serving cell may be associated with a second carrier. In some aspects, the first carrier and the second carrier may be aggregated for downlink data communications (e.g., for PDSCH communications). In some aspects, the first serving cell may be a primary cell (e.g., a PCell) and the second serving cell may be a secondary cell (e.g., a PSCell, an SCell, and/or the like). In some aspects, the first serving cell may be a secondary cell and the second serving cell may be a primary cell.

Example 800 depicts a UE 120 that may be configured with multi-carrier scheduling for PDSCH communications and single-carrier scheduling for PUSCH communications. As shown in FIG. 8, the single-carrier scheduling may be cross-carrier scheduling (e.g., the first serving cell may transmit DCI for scheduling a PUSCH communication on the first serving cell and the first serving cell may transmit DCI for scheduling a PUSCH communication on the second serving cell). In some aspects, the UE 120 may support carrier aggregation for uplink carriers (e.g., the first carrier and the second carrier may be aggregated for uplink as well as downlink). In some aspects, the UE 120 may not support carrier aggregation for uplink carriers.

The UE 120 may be configured to monitor a set of PDCCH candidates for DCI that schedules PDSCH communications on the first serving cell and the second serving cell (e.g., for a multi-carrier scheduling DCI), a set of PDCCH candidates for DCI that schedules PUSCH communications on the first serving cell (e.g., for a single-carrier scheduling DCI), and a set of PDCCH candidates for DCI that schedules PUSCH communications on the second serving cell (e.g., for a single-carrier scheduling DCI). The UE 120 may monitor each set of PDCCH candidates in search spaces associated with each set of PDCCH candidates. As shown in FIG. 8, each set of PDCCH candidates may be associated with the first serving cell. For example, the first carrier associated with the first serving cell may be a scheduling carrier.

In some aspects, the set of PDCCH candidates for DCI that schedules PUSCH communications on the first serving cell may be associate with a first CIF value and the set of PDCCH candidates for DCI that schedules PUSCH communications on the second serving cell may be associated with a second CIF value. As a result, the UE 120 may determine if DCI is scheduling a PUSCH communication on the first serving cell or the second serving cell based at least in part on a CIF value indicated by the DCI.

In some aspects, the set of PDCCH candidates for DCI that schedules PDSCH communications on the first serving cell and the second serving cell may be the same as set of PDCCH candidates for DCI that schedules PUSCH communications on the first serving cell (e.g., when the set of PDCCH candidates for DCI that schedules PDSCH communications on the first serving cell and the second serving cell is associated with the first serving cell). That is, PDCCH candidates for multi-carrier scheduling for PDSCH communications at a carrier may be the same as PDCCH candidates for single-carrier/self-carrier scheduling for PUSCH at the same carrier. In some aspects, if the set of PDCCH candidates for DCI that schedules PDSCH communications on the first serving cell and the second serving cell is the same as set of PDCCH candidates for DCI that schedules PUSCH communications on the first serving cell, the set of PDCCH candidates for DCI that schedules PDSCH communications on the first serving cell and the second serving cell may be associated with a third CIF value.

As shown by reference number 805, a base station 110 associated with the first serving cell may transmit a single DCI to schedule a PDSCH communication on the first serving cell (e.g., on the first carrier) and to schedule a PDSCH communication on the second serving cell (e.g., on the second carrier). The UE 120 may receive the DCI based at least in part on monitoring the set of PDCCH candidates associated with the DCI in a search space. If the set of PDCCH candidates for DCI that schedules PDSCH communications on the first serving cell and the second serving cell is the same as the set of PDCCH candidates for DCI that schedules PUSCH communications on the first serving cell, the UE 120 may determine that the DCI is scheduling PDSCH communications on both the first serving cell and the second serving cell based at least in part on a payload size of the DCI, an identifier indicated by the DCI, and/or the like. In some aspects, the UE 120 may determine that the DCI is scheduling PDSCH communications on both the first serving cell and the second serving cell based at least in part on a CIF value indicated by the DCI (e.g., if the DCI indicates the third CIF value). In some aspects, if the set of PDCCH candidates for DCI that schedules PDSCH communications on the first serving cell and the second serving cell is different than the set of PDCCH candidates for DCI that schedules PUSCH communications on the first serving cell, the UE 120 may determine that the DCI is scheduling PDSCH communications on both the first serving cell and the second serving cell based at least in part on the set of PDCCH candidates used to transmit the DCI.

As shown by reference number 810, the base station 110 associated with the first serving cell may transmit DCI to schedule a PUSCH communication on the first serving cell (e.g., on the first carrier). The UE 120 may receive the DCI based at least in part on monitoring the set of PDCCH candidates associated with the DCI in a search space. If the set of PDCCH candidates for DCI that schedules PDSCH communications on the first serving cell and the second serving cell is the same as the set of PDCCH candidates for DCI that schedules PUSCH communications on the first serving cell, the UE 120 may determine that the DCI is scheduling a PUSCH communication on the first serving cell based at least in part on a payload size of the DCI, an identifier indicated by the DCI, and/or the like. In some aspects, the UE 120 may determine that the DCI is scheduling a PUSCH communication on the first serving cell based at least in part on a CIF value indicated by the DCI (e.g., if the DCI indicates the first CIF value). In some aspects, if the set of PDCCH candidates for DCI that schedules PDSCH communications on the first serving cell and the second serving cell is different than the set of PDCCH candidates for DCI that schedules PUSCH communications on the first serving cell, the UE 120 may determine that the DCI is scheduling a PUSCH communication on the first serving cell based at least in part on the set of PDCCH candidates used to transmit the DCI.

As shown by reference number 815, the base station 110 associated with the first serving cell may transmit DCI to schedule a PUSCH communication on the second serving cell (e.g., on the second carrier). The UE 120 may receive the DCI based at least in part on monitoring the set of PDCCH candidates associated with the DCI in a search space. In some aspects, the UE 120 may determine that the DCI is scheduling a PUSCH communication on the second serving cell based at least in part on a CIF value indicated by the DCI (e.g., if the DCI indicates the second CIF value). In some aspects, the UE 120 may determine that the DCI is scheduling a PUSCH communication on the second serving cell based at least in part on the set of PDCCH candidates used to transmit the DCI.

As described above, the UE 120 may monitor for uplink DCI at the scheduling carrier (e.g., the first carrier of the first serving cell as shown in FIG. 8) for single-carrier scheduling DCI. The UE 120 may not monitor for downlink DCI at each carrier (e.g., as the UE 120 is configured to use multi-carrier scheduling DCI for PDSCH communications). This may conserve resources and improve network efficiency as the UE 120 may use a single DCI to schedule multiple PDSCH communications while also not increasing blind PDCCH decoding complexity associated with the UE 120 receiving DCI.

Additionally, this may conserve network resources as DCI for multiple serving cells may be transmitted on a single serving cell. For example, the carrier of the second serving cell may operate with DSS and may have limited resources available due to a sharing of resources between multiple RATs. Therefore, resources associated with transmitting DCI for the UE 120 can be allocated to the first serving cell (which may not operate with DSS and may have more resources available). As a result, the network may improve efficiency by transmitting DCI on the first serving cell for both the first serving cell and the second serving cell.

As indicated above, FIG. 8 is provided as an example. Other examples may differ from what is described with respect to FIG. 8.

Figure 9:
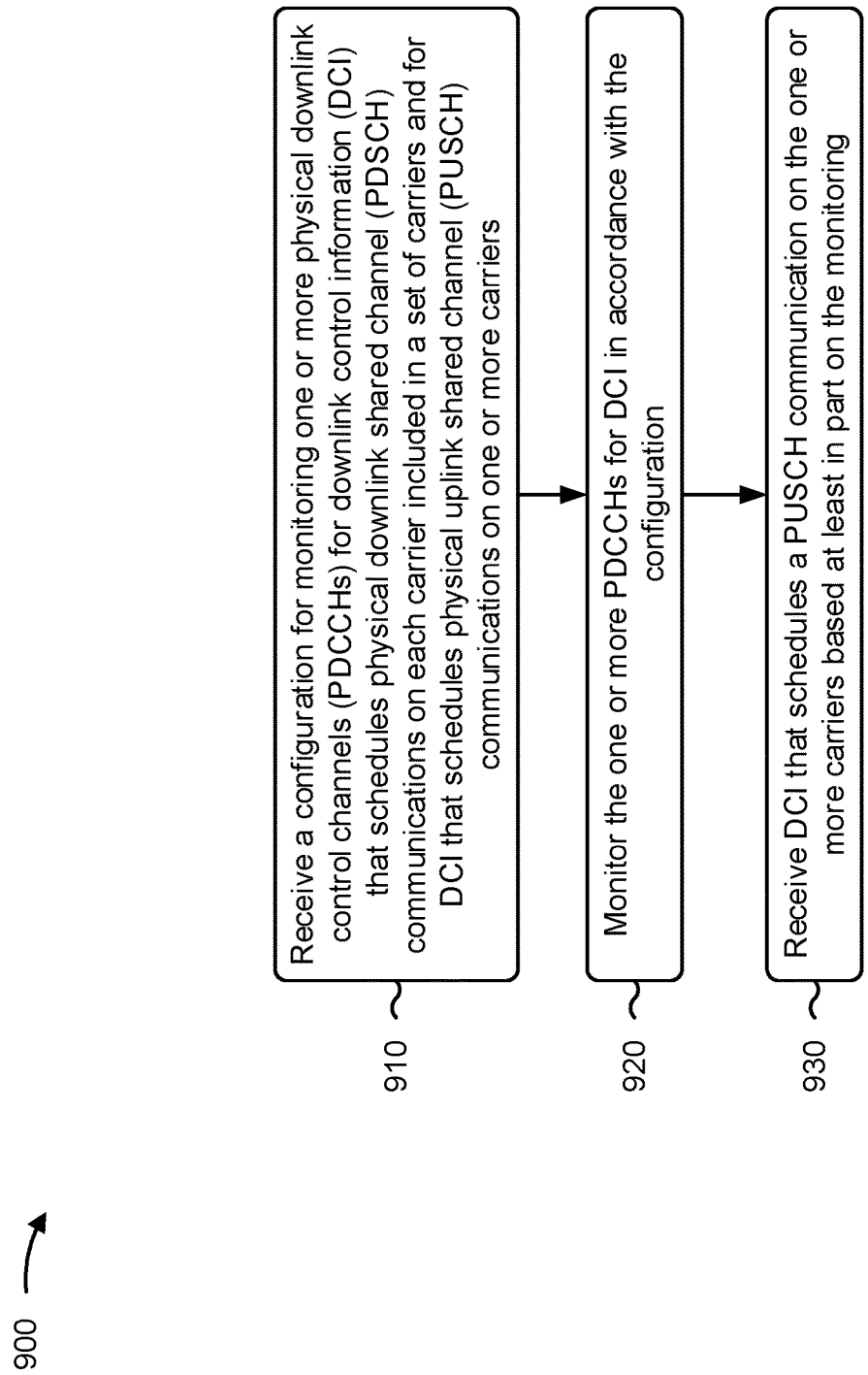
FIGS. 9-10 are diagrams illustrating example processes associated with multi-carrier scheduling for downlink and uplink communications, in accordance with the present disclosure.

FIG. 9 is a diagram illustrating an example process 900 performed, for example, by a UE, in accordance with the present disclosure. Example process 900 is an example where the UE (e.g., UE 120) performs operations associated with multi-carrier scheduling for downlink and uplink.

As shown in FIG. 9, in some aspects, process 900 may include receiving a configuration for monitoring one or more PDCCHs for DCI that schedules PDSCH communications on each carrier included in a set of carriers and for DCI that schedules PUSCH communications on one or more carriers (block 910). For example, the UE (e.g., using antenna 252, demodulator 254, MIMO detector 256, receive processor 258, controller/processor 280, and/or memory 282) may receive a configuration for monitoring one or more PDCCHs for DCI that schedules PDSCH communications on each carrier included in a set of carriers and for DCI that schedules PUSCH communications on one or more carriers, as described above.

As further shown in FIG. 9, in some aspects, process 900 may include monitoring the one or more PDCCHs for DCI in accordance with the configuration (block 920). For example, the UE (e.g., using antenna 252, demodulator 254, MIMO detector 256, receive processor 258, transmit processor 264, TX MIMO processor 266, modulator 254, controller/processor 280, and/or memory 282) may monitor the one or more PDCCHs for DCI in accordance with the configuration, as described above.

As further shown in FIG. 9, in some aspects, process 900 may include receiving DCI that schedules a PUSCH communication on the one or more carriers based at least in part on the monitoring (block 930). For example, the UE (e.g., using antenna 252, demodulator 254, MIMO detector 256, receive processor 258, controller/processor 280, and/or memory 282) may receive DCI that schedules a PUSCH communication on the one or more carriers based at least in part on the monitoring, as described above.

Process 900 may include additional aspects, such as any single aspect or any combination of aspects described below and/or in connection with one or more other processes described elsewhere herein.

In a first aspect, the set of carriers comprises a first carrier associated with a first serving cell and a second carrier associated with a second serving cell.

In a second aspect, alone or in combination with the first aspect, the configuration indicates a set of PDCCH candidates for the DCI that schedules PDSCH communications on each carrier included in the set of carriers and one or more other sets of PDCCH candidates for DCI that schedules PDSCH communications on one or more other sets of carriers.

In a third aspect, alone or in combination with one or more of the first and second aspects, the configuration indicates at least one of a search space configuration for the DCI that schedules PDSCH communications on each carrier included in the set of carriers, a CIF value associated with the DCI that schedules PDSCH communications on each carrier included in the set of carriers, a payload size associated with the DCI that schedules PDSCH communications on each carrier included in the set of carriers, or a DCI format associated with the DCI that schedules PDSCH communications on each carrier included in the set of carriers.

In a fourth aspect, alone or in combination with one or more of the first through third aspects, the configuration indicates that downlink carriers include the set of carriers and uplink carriers include the set of carriers.

In a fifth aspect, alone or in combination with one or more of the first through fourth aspects, monitoring the one or more PDCCHs for DCI in accordance with the configuration comprises monitoring a PDCCH for DCI that schedules PUSCH communications on each carrier included in the set of carriers, and receiving the DCI that schedules the PUSCH communication on the one or more carriers comprises receiving DCI that schedules PUSCH communications on each carrier included in the set of carriers.

In a sixth aspect, alone or in combination with one or more of the first through fifth aspects, the set of carriers includes a first carrier associated with a first serving cell and a second carrier associated with a second serving cell, and monitoring the PDCCH for DCI that schedules the PUSCH communication on the set of carriers comprises monitoring a PDCCH of the first cell for the DCI that schedules a PUSCH communication on the first carrier and a PUSCH communication on the second carrier, or monitoring a PDCCH of the second cell for the DCI that schedules a PUSCH communication on the first carrier and a PUSCH communication on the second carrier.

In a seventh aspect, alone or in combination with one or more of the first through sixth aspects, the DCI that schedules the PUSCH communication on each carrier included in the set of carriers is a multi-carrier scheduling type DCI.

In an eighth aspect, alone or in combination with one or more of the first through seventh aspects, the configuration indicates a set of PDCCH candidates for the DCI that schedules PDSCH communications on each carrier included in the set of carriers and for DCI that schedules PUSCH communications on each carrier included in the set of carriers.

In a ninth aspect, alone or in combination with one or more of the first through eighth aspects, the configuration indicates a search space configuration for the set of PDCCH candidates.

In a tenth aspect, alone or in combination with one or more of the first through ninth aspects, the configuration indicates an identifier associated with the DCI that schedules PDSCH communications on each carrier included in the set of carriers, and an identifier associated with the DCI that schedules PUSCH communications on each carrier included in the set of carriers.

In an eleventh aspect, alone or in combination with one or more of the first through tenth aspects, a payload size of the DCI that schedules PDSCH communications on each carrier included in the set of carriers is the same as a payload size of the DCI that schedules PUSCH communications on each carrier included in set of carriers.

In a twelfth aspect, alone or in combination with one or more of the first through eleventh aspects, receiving the DCI that schedules the PUSCH communication on the one or more carriers comprises receiving DCI that indicates the identifier associated with the DCI that schedules PUSCH communications on each carrier included in the set of carriers, and determining that the DCI is scheduling a PUSCH communication on each carrier included in the set of carriers based at least in part on the receiving the DCI that indicates the identifier associated with the DCI that schedules PUSCH communications on each carrier included in the set of carriers.

In a thirteenth aspect, alone or in combination with one or more of the first through twelfth aspects, the configuration indicates a first set of PDCCH candidates for the DCI that schedules PDSCH communications on each carrier included in the set of carriers, and a second set of PDCCH candidates for the DCI that schedules PUSCH communications on each carrier included in the set of carriers.

In a fourteenth aspect, alone or in combination with one or more of the first through thirteenth aspects, the configuration indicates a first search space configuration for the first set of PDCCH candidates, and a second search space configuration for the second set of PDCCH candidates.

In a fifteenth aspect, alone or in combination with one or more of the first through fourteenth aspects, monitoring the one or more PDCCHs for DCI in accordance with the configuration comprises monitoring the first set of PDCCH candidates in a first search space configured by the first search space configuration for DCI that schedules PDSCH communications on each carrier included in the set of carriers, and monitoring the second set of PDCCH candidates in a second search space configured by the second search space configuration for DCI that schedules PUSCH communications on each carrier included in the set of carriers.

In a sixteenth aspect, alone or in combination with one or more of the first through fifteenth aspects, the configuration indicates that downlink carriers include the set of carriers and uplink carriers include a subset of carriers of the set of carriers.

In a seventeenth aspect, alone or in combination with one or more of the first through sixteenth aspects, monitoring the one or more PDCCHs for DCI in accordance with the configuration comprises monitoring a PDCCH for a DCI that schedules a PUSCH communication on a carrier of the subset of carriers, and receiving the DCI that schedules the PUSCH communication on the one or more carriers comprises receiving DCI that schedules a PUSCH communication on the carrier of the subset of carriers.

In an eighteenth aspect, alone or in combination with one or more of the first through seventeenth aspects, the carrier of the subset of carriers is associated with a first serving cell, and monitoring the PDCCH for the DCI that schedules the PUSCH communication on the carrier of the subset of carriers comprises monitoring a PDCCH of the first serving cell for DCI that schedules the PUSCH communication on the carrier of the subset of carriers, or monitoring a PDCCH of a second serving cell for DCI that schedules the PUSCH communication on the carrier of the subset of carriers.

In a nineteenth aspect, alone or in combination with one or more of the first through eighteenth aspects, the DCI that schedules the PUSCH communication on the one or more carriers is a single-carrier scheduling type DCI.

In a twentieth aspect, alone or in combination with one or more of the first through nineteenth aspects, monitoring the one or more PDCCHs for DCI in accordance with the configuration comprises monitoring a PDCCH associated with a first serving cell for DCI that schedules a PDSCH communication on each carrier included in the set of carriers, monitoring a PDCCH associated with the first serving cell for DCI that schedules a PUSCH communication on a carrier associated with the first serving cell, and monitoring a PDCCH associated with a second serving cell for DCI that schedules a PUSCH communication on a carrier associated with the second serving cell.

In a twenty-first aspect, alone or in combination with one or more of the first through twentieth aspects, monitoring the one or more PDCCHs for DCI in accordance with the configuration comprises monitoring a PDCCH associated with a first carrier included in the set of carriers for DCI that schedules PDSCH communications on each carrier included in the set of carriers, and monitoring the PDCCH associated with the first carrier for DCI that schedules PUSCH communications on a single carrier included in the set of carriers.

In a twenty-second aspect, alone or in combination with one or more of the first through twenty-first aspects, the configuration indicates a set of PDCCH candidates associated with the first carrier, and the set of PDCCH candidates are associated with DCI that schedules PDSCH communications on each carrier included in the set of carriers and DCI that schedules PUSCH communications on the single carrier.

In a twenty-third aspect, alone or in combination with one or more of the first through twenty-second aspects, the configuration indicates a search space configuration associated with the set of PDCCH candidates.

In a twenty-fourth aspect, alone or in combination with one or more of the first through twenty-third aspects, the configuration indicates an identifier associated with the DCI that schedules PDSCH communications on each carrier included in the set of carriers, and an identifier associated with the DCI that schedules PUSCH communications on the single carrier.

In a twenty-fifth aspect, alone or in combination with one or more of the first through twenty-fourth aspects, a payload size of the DCI that schedules PDSCH communications on each carrier included in the set of carriers is the same as a payload size of the DCI that schedules PUSCH communications on the single carrier.

In a twenty-sixth aspect, alone or in combination with one or more of the first through twenty-fifth aspects, receiving the DCI that schedules the PUSCH communication on the one or more carriers comprises receiving DCI that indicates the identifier associated with the DCI that schedules PUSCH communications on the single carrier, and determining that the DCI is scheduling a PUSCH communication on the single carrier based at least in part on the receiving the DCI that indicates the identifier associated with the DCI that schedules PUSCH communications on the single carrier.

In a twenty-seventh aspect, alone or in combination with one or more of the first through twenty-sixth aspects, the configuration indicates a first set of PDCCH candidates associated DCI that schedules PDSCH communications on each carrier included in the set of carriers, and a second set of PDCCH candidates associated with DCI that schedules PUSCH communications on the single carrier.

In a twenty-eighth aspect, alone or in combination with one or more of the first through twenty-seventh aspects, the configuration indicates a first search space configuration associated with the first set of PDCCH candidates, and a second search space configuration associated with the second set of PDCCH candidates.

In a twenty-ninth aspect, alone or in combination with one or more of the first through twenty-eighth aspects, monitoring the one or more PDCCHs for DCI in accordance with the configuration comprises monitoring the first set of PDCCH candidates in a first search space configured by the first search space configuration for DCI that schedules PDSCH communications on each carrier included in the set of carriers, and monitoring the second set of PDCCH candidates in a second search space configured by the second search space configuration for DCI that schedules PUSCH communications on the single carrier.

In a thirtieth aspect, alone or in combination with one or more of the first through twenty-ninth aspects, the single carrier is the first carrier.

In a thirty-first aspect, alone or in combination with one or more of the first through thirtieth aspects, the single carrier is a second carrier included in the set of carriers.

In a thirty-second aspect, alone or in combination with one or more of the first through thirty-first aspects, monitoring the one or more PDCCHs for DCI in accordance with the configuration comprises monitoring a PDCCH associated with a first carrier included in the set of carriers for DCI that schedules PDSCH communications on each carrier included in the set of carriers, monitoring the PDCCH associated with the first carrier for DCI that schedules PUSCH communications on the first carrier, and monitoring the PDCCH associated with the first carrier for DCI that schedules PUSCH communications on a second carrier included in the set of carriers.

In a thirty-third aspect, alone or in combination with one or more of the first through thirty-second aspects, the configuration indicates a first carrier indicator field (CIF) value associated with the DCI that schedules PUSCH communications on the first carrier, and a second CIF value associated with the DCI that schedules PUSCH communications on the second carrier.

In a thirty-fourth aspect, alone or in combination with one or more of the first through thirty-third aspects, the configuration indicates a third CIF value associated with the DCI that schedules PDSCH communications on each carrier included in the set of carriers.

In a thirty-fifth aspect, alone or in combination with one or more of the first through thirty-fourth aspects, the first carrier is a scheduling carrier.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
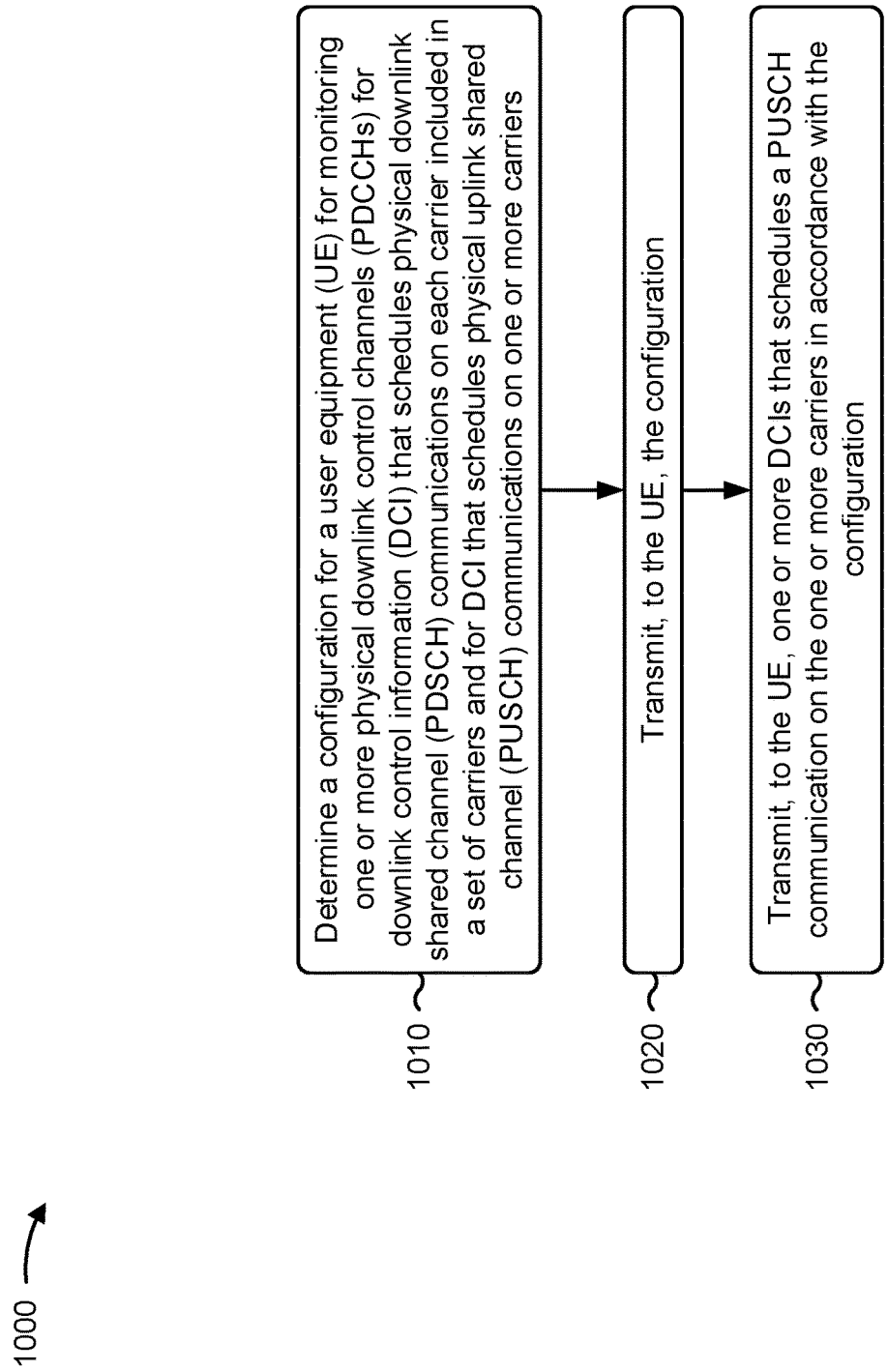

FIG. 10 is a diagram illustrating an example process 1000 performed, for example, by a base station, in accordance with the present disclosure. Example process 1000 is an example where the base station (e.g., base station 110) performs operations associated with multi-carrier scheduling for downlink and uplink.

As shown in FIG. 10, in some aspects, process 1000 may include determining a configuration for a UE for monitoring one or more PDCCHs for DCI that schedules PDSCH communications on each carrier included in a set of carriers and for DCI that schedules PUSCH communications on one or more carriers (block 1010). For example, the base station (e.g., using transmit processor 220, TX MIMO processor 230, modulator 232, antenna 234, demodulator 232, MIMO detector 236, receive processor 238, controller/processor 240, memory 242, and/or scheduler 246) may determine a configuration for a UE for monitoring one or more PDCCHs for DCI that schedules PDSCH communications on each carrier included in a set of carriers and for DCI that schedules PUSCH communications on one or more carriers, as described above.

As further shown in FIG. 10, in some aspects, process 1000 may include transmitting, to the UE, the configuration (block 1020). For example, the base station (e.g., using transmit processor 220, TX MIMO processor 230, modulator 232, antenna 234, controller/processor 240, memory 242, and/or scheduler 246) may transmit, to the UE, the configuration, as described above.

As further shown in FIG. 10, in some aspects, process 1000 may include transmitting, to the UE, one or more DCIs that schedules a PUSCH communication on the one or more carriers in accordance with the configuration (block 1030). For example, the base station (e.g., using transmit processor 220, TX MIMO processor 230, modulator 232, antenna 234, controller/processor 240, memory 242, and/or scheduler 246) may transmit, to the UE, one or more DCIs that schedules a PUSCH communication on the one or more carriers in accordance with the configuration, as described above.

Process 1000 may include additional aspects, such as any single aspect or any combination of aspects described below and/or in connection with one or more other processes described elsewhere herein.

In a first aspect, the base station is associated with a carrier included in the set of carriers.

In a second aspect, alone or in combination with the first aspect, determining the configuration comprises determining a set of PDCCH candidates for the DCI that schedules PDSCH communications on each carrier included in the set of carriers and one or more other sets of PDCCH candidates for DCI that schedules PDSCH communications on one or more other sets of carriers.

In a third aspect, alone or in combination with one or more of the first and second aspects, determining the configuration comprises determining at least one of a search space configuration for the DCI that schedules PDSCH communications on each carrier included in the set of carriers, a CIF value associated with the DCI that schedules PDSCH communications on each carrier included in the set of carriers, a payload size associated with the DCI that schedules PDSCH communications on each carrier included in the set of carriers, or a DCI format associated with the DCI that schedules PDSCH communications on each carrier included in the set of carriers.

In a fourth aspect, alone or in combination with one or more of the first through third aspects, determining the configuration comprises determining that downlink carriers of the UE include the set of carriers and that uplink carriers of the UE include the set of carriers.

In a fifth aspect, alone or in combination with one or more of the first through fourth aspects, transmitting the one or more DCI that schedules the PUSCH communication on the one or more carriers comprises transmitting DCI that schedules PUSCH communications on each carrier included in the set of carriers.

In a sixth aspect, alone or in combination with one or more of the first through fifth aspects, the base station is associated with a first serving cell and the set of carriers includes a first carrier associated with the first serving cell and a second carrier associated with a second serving cell, and transmitting the one or more DCI that schedules the PUSCH communication on the one or more carriers comprises transmitting DCI in a PDCCH of the first cell that schedules a PUSCH communication on the first carrier and a PUSCH communication on the second carrier.

In a seventh aspect, alone or in combination with one or more of the first through sixth aspects, the DCI that schedules the PUSCH communication on each carrier included in the set of carriers is a multi-carrier scheduling type DCI.

In an eighth aspect, alone or in combination with one or more of the first through seventh aspects, determining the configuration comprises determining a set of PDCCH candidates for the DCI that schedules PDSCH communications on each carrier included in the set of carriers and for the DCI that schedules PUSCH communications on each carrier included in the set of carriers.

In a ninth aspect, alone or in combination with one or more of the first through eighth aspects, determining the configuration comprises determining a search space configuration for the set of PDCCH candidates.

In a tenth aspect, alone or in combination with one or more of the first through ninth aspects, determining the configuration comprises determining an identifier associated with the DCI that schedules PDSCH communications on each carrier included in the set of carriers, and determining an identifier associated with the DCI that schedules PUSCH communications on each carrier included in the set of carriers.

In an eleventh aspect, alone or in combination with one or more of the first through tenth aspects, a payload size of the DCI that schedules PDSCH communications on the set of carriers is the same as a payload size of the DCI that schedules PUSCH communications on the set of carriers.

In a twelfth aspect, alone or in combination with one or more of the first through eleventh aspects, transmitting the one or more DCI that schedules the PUSCH communication on the one or more carriers comprises transmitting DCI that indicates the identifier associated with the DCI that schedules PUSCH communications on each carrier included in the set of carriers.

In a thirteenth aspect, alone or in combination with one or more of the first through twelfth aspects, determining the configuration comprises determining a first set of PDCCH candidates for the DCI that schedules PDSCH communications on each carrier included in the set of carriers, and determining a second set of PDCCH candidates for the DCI that schedules PUSCH communications on each carrier included in the set of carriers.

In a fourteenth aspect, alone or in combination with one or more of the first through thirteenth aspects, the determining the configuration comprises determining a first search space configuration for the first set of PDCCH candidates, and determining a second search space configuration for the second set of PDCCH candidates.

In a fifteenth aspect, alone or in combination with one or more of the first through fourteenth aspects, transmitting the one or more DCI that schedules the PUSCH communication on the one or more carriers comprises transmitting DCI using the first set of PDCCH candidates in a first search space configured by the first search space configuration for DCI that schedules a PDSCH communication on each carrier included in the set of carriers, and transmitting DCI using the second set of PDCCH candidates in a second search space configured by the second search space configuration for DCI that schedules a PUSCH communication on each carrier included in the set of carriers.

In a sixteenth aspect, alone or in combination with one or more of the first through fifteenth aspects, determining the configuration comprises determining that downlink carriers of the UE include the set of carriers and uplink carriers of the UE include a subset of carriers of the set of carriers.

In a seventeenth aspect, alone or in combination with one or more of the first through sixteenth aspects, transmitting the one or more DCI that schedules the PUSCH communication on the one or more carriers comprises transmitting DCI that schedules a PUSCH communication on the carrier of the subset of carriers.

In an eighteenth aspect, alone or in combination with one or more of the first through seventeenth aspects, the base station is associated with a first serving cell, and transmitting DCI that schedules a PUSCH communication on the carrier of the subset of carriers comprises transmitting the DCI in a PDCCH of the first serving cell that schedules the PUSCH communication on a carrier associated with the first serving cell, or transmitting the DCI in a PDCCH of the first serving cell that schedules a PUSCH communication on a carrier associated with a second serving cell.

In a nineteenth aspect, alone or in combination with one or more of the first through eighteenth aspects, the DCI that schedules the PUSCH communication on the one or more carriers is a single-carrier scheduling type DCI.

In a twentieth aspect, alone or in combination with one or more of the first through nineteenth aspects, transmitting the one or more DCI that schedules the PUSCH communication on the one or more carriers comprises transmitting DCI on a PDCCH associated with the base station that schedules a PDSCH communication on each carrier included in the set of carriers, and transmitting DCI on the PDCCH associated with the base station that schedules a PUSCH communication on a carrier associated with the base station.

In a twenty-first aspect, alone or in combination with one or more of the first through twentieth aspects, transmitting the one or more DCI that schedule a PUSCH communication on the one or more carriers comprises transmitting DCI in a PDCCH associated with the base station that schedules PDSCH communications on each carrier included in the set of carriers, and transmitting DCI in the PDCCH associated with the base station that schedule a PUSCH communication on a single carrier included in the set of carriers.

In a twenty-second aspect, alone or in combination with one or more of the first through twenty-first aspects, determining the configuration comprises determining a set of PDCCH candidates associated with the PDCCH associated with the base station, and determining that the set of PDCCH candidates are associated with DCI that schedules PDSCH communications on each carrier included in the set of carriers and DCI that schedules PUSCH communications on the single carrier.

In a twenty-third aspect, alone or in combination with one or more of the first through twenty-second aspects, determining the configuration comprises determining a search space configuration associated with the set of PDCCH candidates.

In a twenty-fourth aspect, alone or in combination with one or more of the first through twenty-third aspects, determining the configuration comprises determining an identifier associated with the DCI that schedules PDSCH communications on each carrier included in the set of carriers, and determining an identifier associated with the DCI that schedules PUSCH communications on the single carrier.

In a twenty-fifth aspect, alone or in combination with one or more of the first through twenty-fourth aspects, a payload size of the DCI that schedules PDSCH communications on each carrier included in the set of carriers is the same as a payload size of the DCI that schedules PUSCH communications on the single carrier.

In a twenty-sixth aspect, alone or in combination with one or more of the first through twenty-fifth aspects, transmitting the one or more DCI that schedule the PUSCH communication on the one or more carriers comprises transmitting DCI that indicates the identifier associated with the DCI that schedules PUSCH communications on the single carrier to schedule a PUSCH communication on the single carrier, and transmitting DCI that indicates the identifier associated with the DCI that schedules PDSCH communications on each carrier included in the set of carriers to schedule a PDSCH communication on each carrier included in the set of carriers.

In a twenty-seventh aspect, alone or in combination with one or more of the first through twenty-sixth aspects, determining the configuration comprises determining a first set of PDCCH candidates associated DCI that schedules PDSCH communications on each carrier included in the set of carriers, and determining a second set of PDCCH candidates associated with DCI that schedules PUSCH communications on the single carrier.

In a twenty-eighth aspect, alone or in combination with one or more of the first through twenty-seventh aspects, determining the configuration comprises determining a first search space configuration associated with the first set of PDCCH candidates, and determining a second search space configuration associated with the second set of PDCCH candidates.

In a twenty-ninth aspect, alone or in combination with one or more of the first through twenty-eighth aspects, transmitting the one or more DCI that schedule the PUSCH communication on the one or more carriers comprises transmitting DCI using the first set of PDCCH candidates in a first search space configured by the first search space configuration for DCI that schedules PDSCH communications on the set of carriers, and transmitting DCI using the second set of PDCCH candidates in a second search space configured by the second search space configuration for DCI that schedules PUSCH communications on the single carrier.

In a thirtieth aspect, alone or in combination with one or more of the first through twenty-ninth aspects, the single carrier is a carrier associated with the base station.

In a thirty-first aspect, alone or in combination with one or more of the first through thirtieth aspects, the single carrier is a carrier associated with another base station.

In a thirty-second aspect, alone or in combination with one or more of the first through thirty-first aspects, transmitting the one or more DCI that schedule the PUSCH communication on the one or more carriers comprises transmitting DCI in a PDCCH associated with the base station that schedules PDSCH communications on each carrier included in the set of carriers, transmitting DCI in the PDCCH associated with the base station that schedules PUSCH communications on the carrier associated with the base station, and transmitting DCI in the PDCCH associated with the base station that schedules PUSCH communications on another carrier associated with another base station.

In a thirty-third aspect, alone or in combination with one or more of the first through thirty-second aspects, determining the configuration comprises determining a first CIF value associated with the DCI that schedules PUSCH communications on the carrier associated with the base station, and determining a second CIF value associated with the DCI that schedules PUSCH communications on the other carrier associated with the other base station.

In a thirty-fourth aspect, alone or in combination with one or more of the first through thirty-third aspects, determining the configuration comprises determining a third CIF value associated with the DCI that schedules PDSCH communications on each carrier included in the set of carriers.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
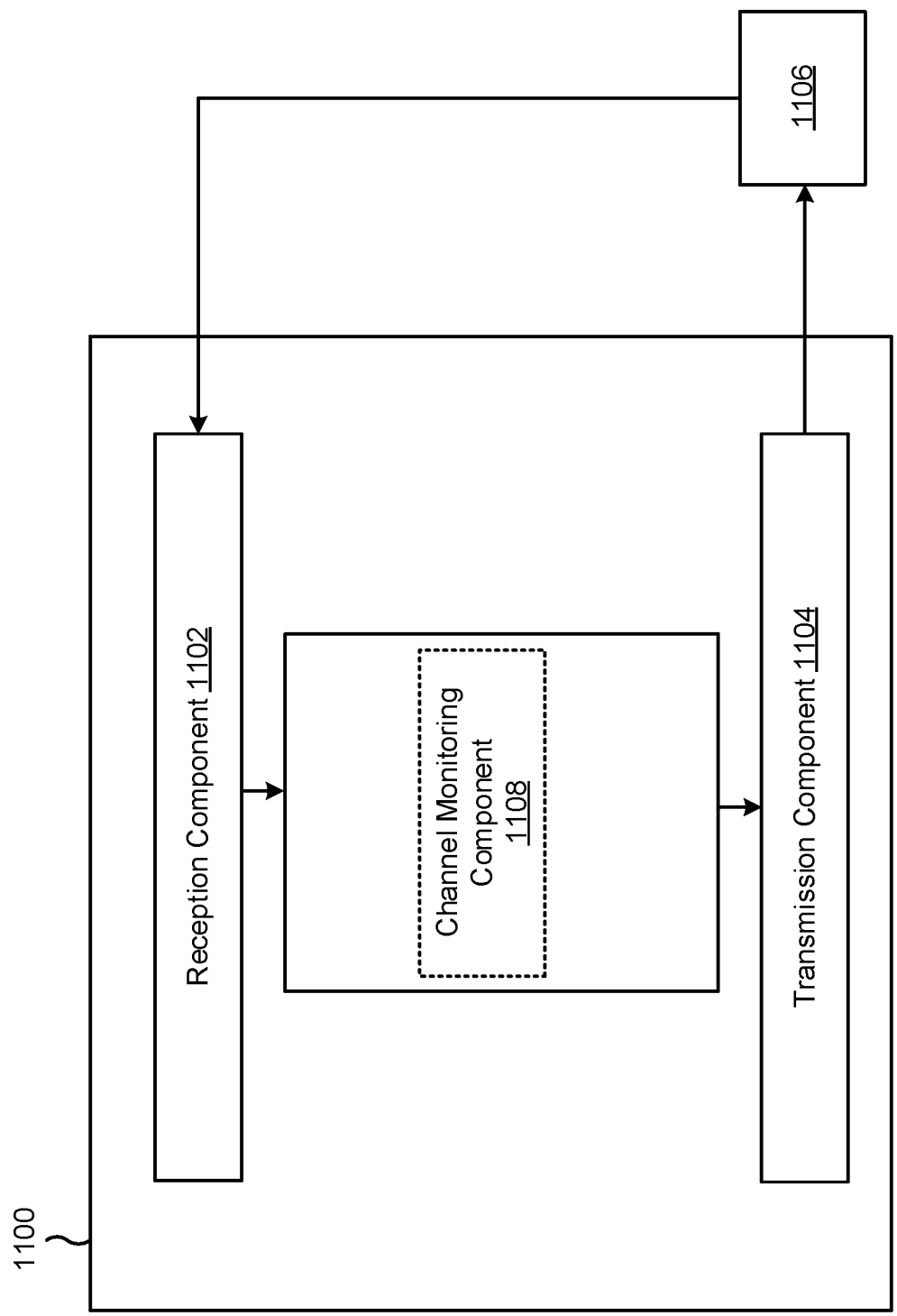
FIGS. 11-12 are block diagrams of example apparatuses for wireless communication, in accordance with the present disclosure.

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include one or more of a channel monitoring component 1108, among other examples.

In some aspects, the apparatus 1100 may be configured to perform one or more operations described herein in connection with FIGS. 5-8. Additionally or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the user equipment described above in connection with FIG. 2. Additionally, or alternatively, one or more components shown in FIG. 11 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the user equipment described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the user equipment described above in connection with FIG. 2. In some aspects, the transmission component 1104 may be co-located with the reception component 1102 in a transceiver.

The reception component 1102 may receive a configuration for monitoring one or more PDCCHs for DCI that schedules PDSCH communications on each carrier included in a set of carriers and for DCI that schedules PUSCH communications on one or more carriers. The channel monitoring component 1108 may monitor the one or more PDCCHs for DCI in accordance with the configuration. In some aspects, the channel monitoring component 1108 may include one or more antennas, a demodulator, a MIMO detector, a receive processor, a modulator, a transmit MIMO processor, a transmit processor, a controller/processor, a memory, or a combination thereof, of the user equipment described above in connection with FIG. 2. The reception component 1102 may receive DCI that schedules a PUSCH communication on the one or more carriers based at least in part on the monitoring.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
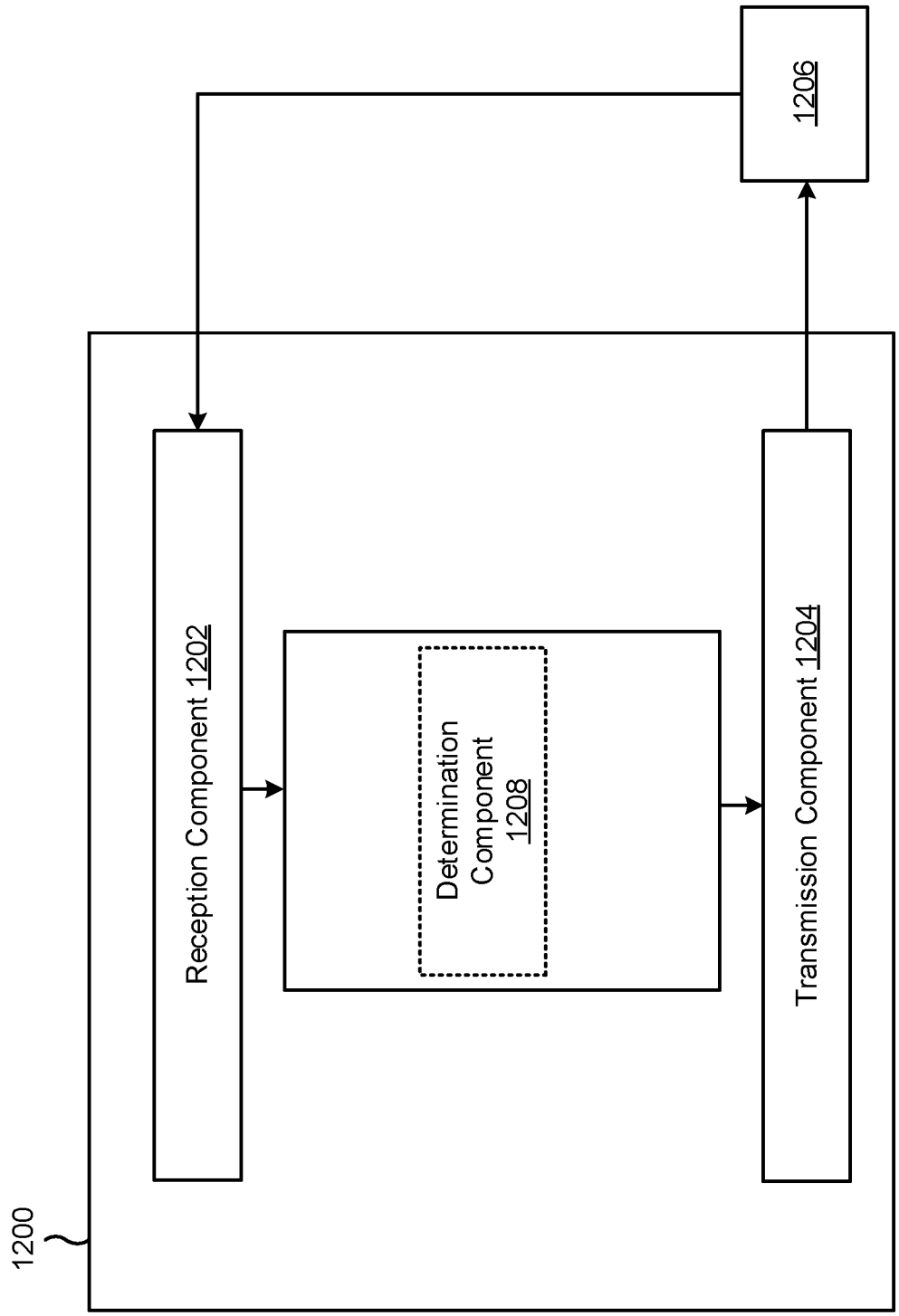

FIG. 12 is a block diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include one or more of a determination component 1208, among other examples.

In some aspects, the apparatus 1200 may be configured to perform one or more operations described herein in connection with FIGS. 5-8. Additionally or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the base station described above in connection with FIG. 2. Additionally, or alternatively, one or more components shown in FIG. 12 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the base station described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station described above in connection with FIG. 2. In some aspects, the transmission component 1204 may be co-located with the reception component 1202 in a transceiver.

The determination component 1208 may determine a configuration for a UE for monitoring one or more PDCCHs for DCI that schedules PDSCH communications on each carrier included in a set of carriers and for DCI that schedules PUSCH communications on one or more carriers. In some aspects, the determination component 1208 may include a receive processor, a transmit MIMO processor, a transmit processor, a controller/processor, a memory, or a combination thereof, of the base station described above in connection with FIG. 2. The transmission component 1204 may transmit, to the UE, the configuration. The transmission component 1204 may transmit, to the UE, one or more DCIs that schedules a PUSCH communication on the one or more carriers in accordance with the configuration.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving a configuration for monitoring one or more physical downlink control channels (PDCCHs) for downlink control information (DCI) that schedules physical downlink shared channel (PDSCH) communications on each carrier included in a set of carriers and for DCI that schedules physical uplink shared channel (PUSCH) communications on one or more carriers; monitoring the one or more PDCCHs for DCI in accordance with the configuration; and receiving DCI that schedules a PUSCH communication on the one or more carriers based at least in part on the monitoring.

Aspect 2: The method of Aspect 1, wherein the set of carriers comprises a first carrier associated with a first serving cell and a second carrier associated with a second serving cell.

Aspect 3: The method of any of Aspects 1-2, wherein the configuration indicates a set of PDCCH candidates for the DCI that schedules PDSCH communications on each carrier included in the set of carriers and one or more other sets of PDCCH candidates for DCI that schedules PDSCH communications on one or more other sets of carriers.

Aspect 4: The method of any of Aspects 1-3, wherein the configuration indicates at least one of: a search space configuration for the DCI that schedules PDSCH communications on each carrier included in the set of carriers, a carrier indicator field (CIF) value associated with the DCI that schedules PDSCH communications on each carrier included in the set of carriers, a payload size associated with the DCI that schedules PDSCH communications on each carrier included in the set of carriers, or a DCI format associated with the DCI that schedules PDSCH communications on each carrier included in the set of carriers.

Aspect 5: The method of any of Aspects 1-4, wherein the configuration indicates that downlink carriers include the set of carriers and uplink carriers include the set of carriers.

Aspect 6: The method of Aspect 5, wherein monitoring the one or more PDCCHs for DCI in accordance with the configuration comprises: monitoring a PDCCH for DCI that schedules PUSCH communications on each carrier included in the set of carriers, and wherein receiving the DCI that schedules the PUSCH communication on the one or more carriers comprises: receiving DCI that schedules PUSCH communications on each carrier included in the set of carriers.

Aspect 7: The method of Aspect 6, wherein the set of carriers includes a first carrier associated with a first serving cell and a second carrier associated with a second serving cell, and wherein monitoring the PDCCH for DCI that schedules the PUSCH communication on the set of carriers comprises: monitoring a PDCCH of the first cell for the DCI that schedules a PUSCH communication on the first carrier and a PUSCH communication on the second carrier; or monitoring a PDCCH of the second cell for the DCI that schedules a PUSCH communication on the first carrier and a PUSCH communication on the second carrier.

Aspect 8: The method of any of Aspects 6-7, wherein the DCI that schedules the PUSCH communication on each carrier included in the set of carriers is a multi-carrier scheduling type DCI.

Aspect 9: The method of any of Aspects 5-8, wherein the configuration indicates a set of PDCCH candidates for the DCI that schedules PDSCH communications on each carrier included in the set of carriers and for DCI that schedules PUSCH communications on each carrier included in the set of carriers.

Aspect 10: The method of Aspect 9, wherein the configuration indicates a search space configuration for the set of PDCCH candidates.

Aspect 11: The method of any of Aspects 9-10, wherein the configuration indicates: an identifier associated with the DCI that schedules PDSCH communications on each carrier included in the set of carriers, and an identifier associated with the DCI that schedules PUSCH communications on each carrier included in the set of carriers.

Aspect 12: The method of Aspect 11, wherein a payload size of the DCI that schedules PDSCH communications on each carrier included in the set of carriers is the same as a payload size of the DCI that schedules PUSCH communications on each carrier included in set of carriers.

Aspect 13: The method of any of Aspects 11-12, wherein receiving the DCI that schedules the PUSCH communication on the one or more carriers comprises: receiving DCI that indicates the identifier associated with the DCI that schedules PUSCH communications on each carrier included in the set of carriers; and determining that the DCI is scheduling a PUSCH communication on each carrier included in the set of carriers based at least in part on the receiving the DCI that indicates the identifier associated with the DCI that schedules PUSCH communications on each carrier included in the set of carriers.

Aspect 14: The method of any of Aspects 5-13, wherein the configuration indicates: a first set of PDCCH candidates for the DCI that schedules PDSCH communications on each carrier included in the set of carriers, and a second set of PDCCH candidates for the DCI that schedules PUSCH communications on each carrier included in the set of carriers.

Aspect 15: The method of Aspect 14, wherein the configuration indicates: a first search space configuration for the first set of PDCCH candidates, and a second search space configuration for the second set of PDCCH candidates.

Aspect 16: The method of Aspect 15, wherein monitoring the one or more PDCCHs for DCI in accordance with the configuration comprises: monitoring the first set of PDCCH candidates in a first search space configured by the first search space configuration for DCI that schedules PDSCH communications on each carrier included in the set of carriers; and monitoring the second set of PDCCH candidates in a second search space configured by the second search space configuration for DCI that schedules PUSCH communications on each carrier included in the set of carriers.

Aspect 17: The method of any of Aspects 1-16, wherein the configuration indicates that downlink carriers include the set of carriers and uplink carriers include a subset of carriers of the set of carriers.

Aspect 18: The method of Aspect 17, wherein monitoring the one or more PDCCHs for DCI in accordance with the configuration comprises: monitoring a PDCCH for a DCI that schedules a PUSCH communication on a carrier of the subset of carriers, and wherein receiving the DCI that schedules the PUSCH communication on the one or more carriers comprises: receiving DCI that schedules a PUSCH communication on the carrier of the subset of carriers.

Aspect 19: The method of Aspect 18, wherein the carrier of the subset of carriers is associated with a first serving cell, and wherein monitoring the PDCCH for the DCI that schedules the PUSCH communication on the carrier of the subset of carriers comprises: monitoring a PDCCH of the first serving cell for DCI that schedules the PUSCH communication on the carrier of the subset of carriers; or monitoring a PDCCH of a second serving cell for DCI that schedules the PUSCH communication on the carrier of the subset of carriers.

Aspect 20: The method of any of Aspects 17-19, wherein the DCI that schedules the PUSCH communication on the one or more carriers is a single-carrier scheduling type DCI.

Aspect 21: The method of any of Aspects 1-20, wherein monitoring the one or more PDCCHs for DCI in accordance with the configuration comprises: monitoring a PDCCH associated with a first serving cell for DCI that schedules a PDSCH communication on each carrier included in the set of carriers; monitoring a PDCCH associated with the first serving cell for DCI that schedules a PUSCH communication on a carrier associated with the first serving cell; and monitoring a PDCCH associated with a second serving cell for DCI that schedules a PUSCH communication on a carrier associated with the second serving cell.

Aspect 22: The method of any of Aspects 1-21, wherein monitoring the one or more PDCCHs for DCI in accordance with the configuration comprises: monitoring a PDCCH associated with a first carrier included in the set of carriers for DCI that schedules PDSCH communications on each carrier included in the set of carriers; and monitoring the PDCCH associated with the first carrier for DCI that schedules PUSCH communications on a single carrier included in the set of carriers.

Aspect 23: The method of Aspect 22, wherein the configuration indicates a set of PDCCH candidates associated with the first carrier, wherein the set of PDCCH candidates are associated with DCI that schedules PDSCH communications on each carrier included in the set of carriers and DCI that schedules PUSCH communications on the single carrier.

Aspect 24: The method of Aspect 23, wherein the configuration indicates a search space configuration associated with the set of PDCCH candidates.

Aspect 25: The method of any of Aspects 23-24, wherein the configuration indicates: an identifier associated with the DCI that schedules PDSCH communications on each carrier included in the set of carriers, and an identifier associated with the DCI that schedules PUSCH communications on the single carrier.

Aspect 26: The method of Aspect 25, wherein a payload size of the DCI that schedules PDSCH communications on each carrier included in the set of carriers is the same as a payload size of the DCI that schedules PUSCH communications on the single carrier.

Aspect 27: The method of any of Aspects 25-26, wherein receiving the DCI that schedules the PUSCH communication on the one or more carriers comprises: receiving DCI that indicates the identifier associated with the DCI that schedules PUSCH communications on the single carrier; and determining that the DCI is scheduling a PUSCH communication on the single carrier based at least in part on the receiving the DCI that indicates the identifier associated with the DCI that schedules PUSCH communications on the single carrier.

Aspect 28: The method of any of Aspects 22-27, wherein the configuration indicates: a first set of PDCCH candidates associated DCI that schedules PDSCH communications on each carrier included in the set of carriers, and a second set of PDCCH candidates associated with DCI that schedules PUSCH communications on the single carrier.

Aspect 29: The method of Aspect 28, wherein the configuration indicates: a first search space configuration associated with the first set of PDCCH candidates, and a second search space configuration associated with the second set of PDCCH candidates.

Aspect 30: The method of Aspect 29, wherein monitoring the one or more PDCCHs for DCI in accordance with the configuration comprises: monitoring the first set of PDCCH candidates in a first search space configured by the first search space configuration for DCI that schedules PDSCH communications on each carrier included in the set of carriers; and monitoring the second set of PDCCH candidates in a second search space configured by the second search space configuration for DCI that schedules PUSCH communications on the single carrier.

Aspect 31: The method of any of Aspects 22-30, wherein the single carrier is the first carrier.

Aspect 32: The method of any of Aspects 22-30, wherein the single carrier is a second carrier included in the set of carriers.

Aspect 33: The method of any of Aspects 1-32, wherein monitoring the one or more PDCCHs for DCI in accordance with the configuration comprises: monitoring a PDCCH associated with a first carrier included in the set of carriers for DCI that schedules PDSCH communications on each carrier included in the set of carriers; monitoring the PDCCH associated with the first carrier for DCI that schedules PUSCH communications on the first carrier; and monitoring the PDCCH associated with the first carrier for DCI that schedules PUSCH communications on a second carrier included in the set of carriers.

Aspect 34: The method of Aspect 33, wherein the configuration indicates: a first carrier indicator field (CIF) value associated with the DCI that schedules PUSCH communications on the first carrier, and a second CIF value associated with the DCI that schedules PUSCH communications on the second carrier.

Aspect 35: The method of Aspect 34, wherein the configuration indicates: a third CIF value associated with the DCI that schedules PDSCH communications on each carrier included in the set of carriers.

Aspect 36: The method of any of Aspects 33-35, wherein the first carrier is a scheduling carrier.

Aspect 37: A method of wireless communication performed by a base station, comprising: determining a configuration for a user equipment (UE) for monitoring one or more physical downlink control channels (PDCCHs) for downlink control information (DCI) that schedules physical downlink shared channel (PDSCH) communications on each carrier included in a set of carriers and for DCI that schedules physical uplink shared channel (PUSCH) communications on one or more carriers; transmitting, to the UE, the configuration; and transmitting, to the UE, one or more DCIs that schedules a PUSCH communication on the one or more carriers in accordance with the configuration.

Aspect 38: The method of Aspect 37, wherein the base station is associated with a carrier included in the set of carriers.

Aspect 39: The method of any of Aspects 37-38, wherein determining the configuration comprises: determining a set of PDCCH candidates for the DCI that schedules PDSCH communications on each carrier included in the set of carriers and one or more other sets of PDCCH candidates for DCI that schedules PDSCH communications on one or more other sets of carriers.

Aspect 40: The method of any of Aspects 37-39, wherein determining the configuration comprises determining at least one of: a search space configuration for the DCI that schedules PDSCH communications on each carrier included in the set of carriers, a carrier indicator field (CIF) value associated with the DCI that schedules PDSCH communications on each carrier included in the set of carriers, a payload size associated with the DCI that schedules PDSCH communications on each carrier included in the set of carriers, or a DCI format associated with the DCI that schedules PDSCH communications on each carrier included in the set of carriers.

Aspect 41: The method of any of Aspects 37-40, wherein determining the configuration comprises: determining that downlink carriers of the UE include the set of carriers and that uplink carriers of the UE include the set of carriers.

Aspect 42: The method of Aspect 41, wherein transmitting the one or more DCI that schedules the PUSCH communication on the one or more carriers comprises: transmitting DCI that schedules PUSCH communications on each carrier included in the set of carriers.

Aspect 43: The method of Aspect 42, wherein the base station is associated with a first serving cell and the set of carriers includes a first carrier associated with the first serving cell and a second carrier associated with a second serving cell, and wherein transmitting the one or more DCI that schedules the PUSCH communication on the one or more carriers comprises: transmitting DCI in a PDCCH of the first cell that schedules a PUSCH communication on the first carrier and a PUSCH communication on the second carrier.

Aspect 44: The method of any of Aspects 42-43, wherein the DCI that schedules the PUSCH communication on each carrier included in the set of carriers is a multi-carrier scheduling type DCI.

Aspect 45: The method of any of Aspects 41-44, wherein determining the configuration comprises: determining a set of PDCCH candidates for the DCI that schedules PDSCH communications on each carrier included in the set of carriers and for the DCI that schedules PUSCH communications on each carrier included in the set of carriers.

Aspect 46: The method of Aspect 45, wherein determining the configuration comprises: determining a search space configuration for the set of PDCCH candidates.

Aspect 47: The method of any of Aspects 45-46, wherein determining the configuration comprises: determining an identifier associated with the DCI that schedules PDSCH communications on each carrier included in the set of carriers, and determining an identifier associated with the DCI that schedules PUSCH communications on each carrier included in the set of carriers.

Aspect 48: The method of Aspect 47, wherein a payload size of the DCI that schedules PDSCH communications on the set of carriers is the same as a payload size of the DCI that schedules PUSCH communications on the set of carriers.

Aspect 49: The method of any of Aspects 47-48, wherein transmitting the one or more DCI that schedules the PUSCH communication on the one or more carriers comprises: transmitting DCI that indicates the identifier associated with the DCI that schedules PUSCH communications on each carrier included in the set of carriers.

Aspect 50: The method of any of Aspects 41-49, wherein determining the configuration comprises: determining a first set of PDCCH candidates for the DCI that schedules PDSCH communications on each carrier included in the set of carriers; and determining a second set of PDCCH candidates for the DCI that schedules PUSCH communications on each carrier included in the set of carriers.

Aspect 51: The method of Aspect 50, wherein the determining the configuration comprises: determining a first search space configuration for the first set of PDCCH candidates; and determining a second search space configuration for the second set of PDCCH candidates.

Aspect 52: The method of Aspect 51, wherein transmitting the one or more DCI that schedules the PUSCH communication on the one or more carriers comprises: transmitting DCI using the first set of PDCCH candidates in a first search space configured by the first search space configuration for DCI that schedules a PDSCH communication on each carrier included in the set of carriers; and transmitting DCI using the second set of PDCCH candidates in a second search space configured by the second search space configuration for DCI that schedules a PUSCH communication on each carrier included in the set of carriers.

Aspect 53: The method of any of Aspects 37-52, wherein determining the configuration comprises: determining that downlink carriers of the UE include the set of carriers and uplink carriers of the UE include a subset of carriers of the set of carriers.

Aspect 54: The method of Aspect 53, wherein transmitting the one or more DCI that schedules the PUSCH communication on the one or more carriers comprises: transmitting DCI that schedules a PUSCH communication on the carrier of the subset of carriers.

Aspect 55: The method of Aspect 54, wherein the base station is associated with a first serving cell, and wherein transmitting DCI that schedules a PUSCH communication on the carrier of the subset of carriers comprises: transmitting the DCI in a PDCCH of the first serving cell that schedules the PUSCH communication on a carrier associated with the first serving cell; or transmitting the DCI in a PDCCH of the first serving cell that schedules a PUSCH communication on a carrier associated with a second serving cell.

Aspect 56: The method of any of Aspects 53-55, wherein the DCI that schedules the PUSCH communication on the one or more carriers is a single-carrier scheduling type DCI.

Aspect 57: The method of any of Aspects 37-56, wherein transmitting the one or more DCI that schedules the PUSCH communication on the one or more carriers comprises: transmitting DCI on a PDCCH associated with the base station that schedules a PDSCH communication on each carrier included in the set of carriers; and transmitting DCI on the PDCCH associated with the base station that schedules a PUSCH communication on a carrier associated with the base station.

Aspect 58: The method of any of Aspects 37-57, wherein transmitting the one or more DCI that schedule a PUSCH communication on the one or more carriers comprises: transmitting DCI in a PDCCH associated with the base station that schedules PDSCH communications on each carrier included in the set of carriers; and transmitting DCI in the PDCCH associated with the base station that schedule a PUSCH communication on a single carrier included in the set of carriers.

Aspect 59: The method of Aspect 58, wherein determining the configuration comprises: determining a set of PDCCH candidates associated with the PDCCH associated with the base station; and determining that the set of PDCCH candidates are associated with DCI that schedules PDSCH communications on each carrier included in the set of carriers and DCI that schedules PUSCH communications on the single carrier.

Aspect 60: The method of Aspect 59, wherein determining the configuration comprises: determining a search space configuration associated with the set of PDCCH candidates.

Aspect 61: The method of any of Aspects 59-60, wherein determining the configuration comprises: determining an identifier associated with the DCI that schedules PDSCH communications on each carrier included in the set of carriers, and determining an identifier associated with the DCI that schedules PUSCH communications on the single carrier.

Aspect 62: The method of Aspect 61, wherein a payload size of the DCI that schedules PDSCH communications on each carrier included in the set of carriers is the same as a payload size of the DCI that schedules PUSCH communications on the single carrier.

Aspect 63: The method of any of Aspects 61-62, wherein transmitting the one or more DCI that schedule the PUSCH communication on the one or more carriers comprises: transmitting DCI that indicates the identifier associated with the DCI that schedules PUSCH communications on the single carrier to schedule a PUSCH communication on the single carrier; and transmitting DCI that indicates the identifier associated with the DCI that schedules PDSCH communications on each carrier included in the set of carriers to schedule a PDSCH communication on each carrier included in the set of carriers.

Aspect 64: The method of any of Aspects 58-63, wherein determining the configuration comprises: determining a first set of PDCCH candidates associated DCI that schedules PDSCH communications on each carrier included in the set of carriers, and determining a second set of PDCCH candidates associated with DCI that schedules PUSCH communications on the single carrier.

Aspect 65: The method of Aspect 64, wherein determining the configuration comprises: determining a first search space configuration associated with the first set of PDCCH candidates, and determining a second search space configuration associated with the second set of PDCCH candidates.

Aspect 66: The method of Aspect 65, wherein transmitting the one or more DCI that schedule the PUSCH communication on the one or more carriers comprises: transmitting DCI using the first set of PDCCH candidates in a first search space configured by the first search space configuration for DCI that schedules PDSCH communications on the set of carriers; and transmitting DCI using the second set of PDCCH candidates in a second search space configured by the second search space configuration for DCI that schedules PUSCH communications on the single carrier.

Aspect 67: The method of any of Aspects 58-66, wherein the single carrier is a carrier associated with the base station.

Aspect 68: The method of any of Aspects 58-66, wherein the single carrier is a carrier associated with another base station.

Aspect 69: The method of any of Aspects 37-68, wherein transmitting the one or more DCI that schedule the PUSCH communication on the one or more carriers comprises: transmitting DCI in a PDCCH associated with the base station that schedules PDSCH communications on each carrier included in the set of carriers; transmitting DCI in the PDCCH associated with the base station that schedules PUSCH communications on the carrier associated with the base station; and transmitting DCI in the PDCCH associated with the base station that schedules PUSCH communications on another carrier associated with another base station.

Aspect 70: The method of Aspect 69, wherein determining the configuration comprises: determining a first carrier indicator field (CIF) value associated with the DCI that schedules PUSCH communications on the carrier associated with the base station; and determining a second CIF value associated with the DCI that schedules PUSCH communications on the other carrier associated with the other base station.

Aspect 71: The method of Aspect 70, wherein determining the configuration comprises: determining a third CIF value associated with the DCI that schedules PDSCH communications on each carrier included in the set of carriers.

Aspect 72: An apparatus for wireless communication at a device, comprising a processor; memory coupled with the processor; and instructions stored in the memory and executable by the processor to cause the apparatus to perform the method of one or more of Aspects 1-36.

Aspect 73: A device for wireless communication, comprising a memory and one or more processors coupled to the memory, the one or more processors configured to perform the method of one or more of Aspects 1-36.

Aspect 74: An apparatus for wireless communication, comprising at least one means for performing the method of one or more of Aspects 1-36.

Aspect 75: A non-transitory computer-readable medium storing code for wireless communication, the code comprising instructions executable by a processor to perform the method of one or more of Aspects 1-36.

Aspect 76: A non-transitory computer-readable medium storing a set of instructions for wireless communication, the set of instructions comprising one or more instructions that, when executed by one or more processors of a device, cause the device to perform the method of one or more of Aspects 1-36.

Aspect 77: An apparatus for wireless communication at a device, comprising a processor; memory coupled with the processor; and instructions stored in the memory and executable by the processor to cause the apparatus to perform the method of one or more of Aspects 37-71.

Aspect 78: A device for wireless communication, comprising a memory and one or more processors coupled to the memory, the one or more processors configured to perform the method of one or more of Aspects 37-71.

Aspect 79: An apparatus for wireless communication, comprising at least one means for performing the method of one or more of Aspects 37-71.

Aspect 80: A non-transitory computer-readable medium storing code for wireless communication, the code comprising instructions executable by a processor to perform the method of one or more of Aspects 37-71.

Aspect 81: A non-transitory computer-readable medium storing a set of instructions for wireless communication, the set of instructions comprising one or more instructions that, when executed by one or more processors of a device, cause the device to perform the method of one or more of Aspects 37-71.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving a configuration for monitoring one or more physical downlink control channels (PDCCHs) for downlink control information (DCI) that is capable of utilizing multi-carrier scheduling to schedule physical downlink shared channel (PDSCH) communications on each carrier included in a set of carriers and for DCI that schedules physical uplink shared channel (PUSCH) communications, the configuration indicating a first carrier indicator field (CIF) value corresponding to a first carrier included in the set of carriers, a second CIF value corresponding to a second carrier included in the set of carriers, and a third CIF value corresponding to the first carrier and the second carrier;
   monitoring a PDCCH associated with the first carrier for DCI that schedules PDSCH communications on each carrier included in the set of carriers; and
   receiving DCI that schedules a PUSCH communication based at least in part on the monitoring.

2. The method of claim 1, wherein the configuration indicates at least one of:
   a search space configuration for the DCI that schedules PDSCH communications on each carrier included in the set of carriers,
   a payload size associated with the DCI that schedules PDSCH communications on each carrier included in the set of carriers, or
   a DCI format associated with the DCI that schedules PDSCH communications on each carrier included in the set of carriers.

3. The method of claim 1, wherein the configuration indicates that serving cells for downlink communications comprise the set of carriers and serving cells for uplink communications comprise the set of carriers.

4. The method of claim 3, further comprising:
   monitoring a PDCCH of a serving cell associated with the second carrier for DCI that schedules a PUSCH communication on the first carrier and a PUSCH communication on the second carrier, and
   wherein receiving the DCI that schedules the PUSCH communication comprises:
      receiving DCI that schedules PUSCH communications on each carrier included in the set of carriers.

5. The method of claim 3, wherein the configuration indicates a set of PDCCH candidates for the DCI that schedules PDSCH communications on each carrier included in the set of carriers and for DCI that schedules PUSCH communications on each carrier included in the set of carriers.

6. The method of claim 5, wherein the configuration indicates:
   an identifier associated with the DCI that schedules PDSCH communications on each carrier included in the set of carriers, and
   an identifier associated with the DCI that schedules PUSCH communications on each carrier included in the set of carriers.

7. The method of claim 3, wherein the configuration indicates:
   a first set of PDCCH candidates for the DCI that schedules PDSCH communications on each carrier included in the set of carriers, and
   a second set of PDCCH candidates for the DCI that schedules PUSCH communications on each carrier included in the set of carriers.

8. The method of claim 1, wherein the configuration indicates that serving cells for downlink communications comprise the set of carriers and serving cells for uplink communications comprise a subset of carriers of the set of carriers.

9. The method of claim 8, further comprising:
   monitoring a PDCCH for a DCI that schedules a PUSCH communication on a carrier of the subset of carriers, and
   wherein receiving the DCI that schedules the PUSCH communication comprises:
      receiving DCI that schedules a PUSCH communication on the carrier of the subset of carriers.

10. The method of claim 1, further comprising:
    monitoring a PDCCH associated with a first serving cell for DCI that schedules a PUSCH communication on a carrier associated with the first serving cell; and
    monitoring a PDCCH associated with a second serving cell for DCI that schedules a PUSCH communication on a carrier associated with the second serving cell.

11. The method of claim 1, further comprising:
    monitoring the PDCCH associated with the first carrier for DCI that schedules PUSCH communications on a single carrier included in the set of carriers.

12. The method of claim 11, wherein the configuration indicates a set of PDCCH candidates associated with the first carrier, wherein the set of PDCCH candidates are associated with DCI that schedules PDSCH communications on each carrier included in the set of carriers and DCI that schedules PUSCH communications on the single carrier.

13. The method of claim 11, wherein the configuration indicates:
    a first set of PDCCH candidates associated with DCI that schedules PDSCH communications on each carrier included in the set of carriers, and
    a second set of PDCCH candidates associated with DCI that schedules PUSCH communications on the single carrier.

14. The method of claim 1, further comprising:
monitoring the PDCCH associated with the first carrier for DCI that schedules PUSCH communications on the first carrier; and
monitoring the PDCCH associated with the first carrier for DCI that schedules PUSCH communications on the second carrier.

15. A user equipment (UE) for wireless communication, comprising:
one or more memories; and
one or more processors coupled to the one or more memories, the one or more memories comprising instructions executable by the one or more processors to cause the UE to:
receive a configuration for monitoring one or more physical downlink control channels (PDCCHs) for downlink control information (DCI) that is capable of utilizing multi-carrier scheduling to schedule physical downlink shared channel (PDSCH) communications on each carrier included in a set of carriers and for DCI that schedules physical uplink shared channel (PUSCH) communications, the configuration indicating a first carrier indicator field (CIF) value corresponding to a first carrier included in the set of carriers, a second CIF value corresponding to a second carrier included in the set of carriers, and a third CIF value corresponding to the first carrier and the second carrier;
monitor a PDCCH associated with the first carrier for DCI that schedules PDSCH communications on each carrier included in the set of carriers; and
receive DCI that schedules a PUSCH communication based at least in part on the monitoring.

16. The UE of claim 15, wherein the configuration indicates at least one of:
a search space configuration for the DCI that schedules PDSCH communications on each carrier included in the set of carriers,
a payload size associated with the DCI that schedules PDSCH communications on each carrier included in the set of carriers, or
a DCI format associated with the DCI that schedules PDSCH communications on each carrier included in the set of carriers.

17. The UE of claim 15, wherein the configuration indicates that serving cells for downlink communications comprise the set of carriers and serving cells for uplink communications comprise the set of carriers.

18. The UE of claim 17, wherein the instructions are executable to further cause the UE to:
monitor a PDCCH of a serving cell associated with the second carrier for DCI that schedules a PUSCH communication on the first carrier and a PUSCH communication on the second carrier, and
wherein the instructions, executable to cause the UE to receive the DCI that schedules the PUSCH communication, are executable to cause the UE to:
receive DCI that schedules PUSCH communications on each carrier included in the set of carriers.

19. The UE of claim 17, wherein the configuration indicates a set of PDCCH candidates for the DCI that schedules PDSCH communications on each carrier included in the set of carriers and for DCI that schedules PUSCH communications on each carrier included in the set of carriers.

20. The UE of claim 19, wherein the configuration indicates:
an identifier associated with the DCI that schedules PDSCH communications on each carrier included in the set of carriers, and
an identifier associated with the DCI that schedules PUSCH communications on each carrier included in the set of carriers.

21. The UE of claim 17, wherein the configuration indicates:
a first set of PDCCH candidates for the DCI that schedules PDSCH communications on each carrier included in the set of carriers, and
a second set of PDCCH candidates for the DCI that schedules PUSCH communications on each carrier included in the set of carriers.

22. The UE of claim 15, wherein the configuration indicates that serving cells for downlink communications comprise the set of carriers and serving cells for uplink communications comprise a subset of carriers of the set of carriers.

23. The UE of claim 22, wherein the instructions are executable to further cause the UE to:
monitor a PDCCH for a DCI that schedules a PUSCH communication on a carrier of the subset of carriers, and
wherein the instructions, executable to cause the UE to receive the DCI that schedules the PUSCH communication, are executable to cause the UE to:
receive DCI that schedules a PUSCH communication on the carrier of the subset of carriers.

24. The UE of claim 15, wherein the instructions are executable to further cause the UE to:
monitor a PDCCH associated with a first serving cell for DCI that schedules a PUSCH communication on a carrier associated with the first serving cell; and
monitor a PDCCH associated with a second serving cell for DCI that schedules a PUSCH communication on a carrier associated with the second serving cell.

25. The UE of claim 15, wherein the instructions are executable to further cause the UE to:
monitor the PDCCH associated with the first carrier for DCI that schedules PUSCH communications on a single carrier included in the set of carriers.

26. The UE of claim 25, wherein the configuration indicates a set of PDCCH candidates associated with the first carrier, wherein the set of PDCCH candidates are associated with DCI that schedules PDSCH communications on each carrier included in the set of carriers and DCI that schedules PUSCH communications on the single carrier.

27. The UE of claim 25, wherein the configuration indicates:
a first set of PDCCH candidates associated with DCI that schedules PDSCH communications on each carrier included in the set of carriers, and
a second set of PDCCH candidates associated with DCI that schedules PUSCH communications on the single carrier.

28. The UE of claim 15, wherein the instructions are executable to further cause the UE to:
monitor the PDCCH associated with the first carrier for DCI that schedules PUSCH communications on the first carrier; and
monitor the PDCCH associated with the first carrier for DCI that schedules PUSCH communications on the second carrier.

29. A non-transitory computer-readable medium storing one or more instructions for wireless communication, the one or more instructions, when executed by one or more processors of a user equipment (UE), cause the UE to:
- receive a configuration for monitoring one or more physical downlink control channels (PDCCHs) for downlink control information (DCI) that is capable of utilizing multi-carrier scheduling to schedule physical downlink shared channel (PDSCH) communications on each carrier included in a set of carriers and for DCI that schedules physical uplink shared channel (PUSCH) communications, the configuration indicating a first carrier indicator field (CIF) value corresponding to a first carrier included in the set of carriers, a second CIF value corresponding to a second carrier included in the set of carriers, and a third CIF value corresponding to the first carrier and the second carrier;
- monitor a PDCCH associated with the first carrier for DCI that schedules PDSCH communications on each carrier included in the set of carriers; and
- receive DCI that schedules a PUSCH communication based at least in part on the monitoring.

30. An apparatus for wireless communication, comprising:
- means for receiving a configuration for monitoring one or more physical downlink control channels (PDCCHs) for downlink control information (DCI) that is capable of utilizing multi-carrier scheduling to schedule physical downlink shared channel (PDSCH) communications on each carrier included in a set of carriers and for DCI that schedules physical uplink shared channel (PUSCH) communications, the configuration indicating a first carrier indicator field (CIF) value corresponding to a first carrier included in the set of carriers, a second CIF value corresponding to a second carrier included in the set of carriers, and a third CIF value corresponding to the first carrier and the second carrier;
- means for monitoring a PDCCH associated with the first carrier for DCI that schedules PDSCH communications on each carrier included in the set of carriers; and
- means for receiving DCI that schedules a PUSCH communication based at least in part on the monitoring.

* * * * *